(12) United States Patent
Jo et al.

(10) Patent No.: US 11,256,461 B2
(45) Date of Patent: Feb. 22, 2022

(54) ELECTRONIC DEVICE AND SCREEN SHARING METHOD OF ELECTRONIC DEVICE

(71) Applicant: SAMSUNG ELECTRONICS CO., LTD., Suwon-si (KR)

(72) Inventors: Donghyun Jo, Seoul (KR); Taehyung Kim, Yongin-si (KR); Jinbong Ryu, Yongin-si (KR); Myeongseok Lee, Suwon-si (KR); Sanghun Lee, Gyeongsan-si (KR); Donghyun Yeom, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/497,960

(22) PCT Filed: Mar. 27, 2018

(86) PCT No.: PCT/KR2018/003610
§ 371 (c)(1),
(2) Date: Sep. 26, 2019

(87) PCT Pub. No.: WO2018/182296
PCT Pub. Date: Oct. 4, 2018

(65) Prior Publication Data
US 2020/0057589 A1    Feb. 20, 2020

(30) Foreign Application Priority Data

Mar. 27, 2017    (KR) .................... 10-2017-0038792

(51) Int. Cl.
*G06F 3/041*    (2006.01)
*G06F 3/01*    (2006.01)
(Continued)

(52) U.S. Cl.
CPC ............... *G06F 3/14* (2013.01); *G06F 3/041* (2013.01); *H04L 29/08* (2013.01);
(Continued)

(58) Field of Classification Search
CPC .......... G06F 3/041; G06F 3/14; G06F 3/1454; G09G 2340/0407; G09G 2340/0442; G09G 2354/00; G09G 2340/04; H04L 29/08
(Continued)

(56) References Cited

U.S. PATENT DOCUMENTS 9,880,799 B1 * 1/2018 Bertz ................. H04M 1/72412
2009/0309808 A1 * 12/2009 Swingler ............... G06F 3/1423
345/1.3

(Continued)

FOREIGN PATENT DOCUMENTS

EP    2 672 376    12/2013
EP    3 062 214    8/2016
(Continued)

OTHER PUBLICATIONS

International Search Report for PCT/KR2018/003610 dated Jun. 20, 2018, 4 pages.
(Continued)

*Primary Examiner* — Kwin Xie
(74) *Attorney, Agent, or Firm* — Nixon & Vanderhye, P.C.

(57) ABSTRACT

An electronic device comprises a communication module, a display, a processor, and a memory, wherein the memory can control the communication module such that the processor performs a communication connection for screen sharing with an external electronic device, can acquire display information of the external electronic device from the external electronic device, can generate one or more pieces of
(Continued)

transmission screen information on the basis of at least the display information of the electronic device or the display information of the external electronic device, and can determine the resolution or the screen ratio of the transmission screen information on the basis of at least the screen ratio of the external electronic device.

7 Claims, 17 Drawing Sheets

(51) Int. Cl.
  *H04L 29/08* (2006.01)
  *G06F 3/14* (2006.01)
  *H04L 65/40* (2022.01)
(52) U.S. Cl.
  CPC . *G09G 2340/04* (2013.01); *G09G 2340/0407* (2013.01); *G09G 2340/0442* (2013.01); *G09G 2354/00* (2013.01)
(58) Field of Classification Search
  USPC ................................. 345/173–174
  See application file for complete search history.

(56) References Cited

U.S. PATENT DOCUMENTS

| | | | |
|---|---|---|---|
| 2011/0193898 A1 | 8/2011 | Kim | |
| 2011/0239124 A1* | 9/2011 | Tsujimoto | H04N 1/00464 |
| | | | 715/741 |
| 2011/0283334 A1* | 11/2011 | Choi | H04L 67/148 |
| | | | 725/148 |
| 2012/0060109 A1 | 3/2012 | Han et al. | |
| 2013/0219072 A1 | 8/2013 | Han et al. | |
| 2013/0328878 A1 | 12/2013 | Stahl et al. | |
| 2015/0145750 A1 | 5/2015 | Shin | |
| 2015/0371364 A1 | 12/2015 | Park | |
| 2016/0179295 A1* | 6/2016 | Liang | G06F 3/1454 |
| | | | 715/740 |
| 2016/0239250 A1 | 8/2016 | Kim et al. | |

FOREIGN PATENT DOCUMENTS

| | | |
|---|---|---|
| KR | 10-2007-0052584 | 5/2007 |
| KR | 10-2011-0091281 | 8/2011 |
| KR | 10-2012-0028757 | 3/2012 |
| KR | 10-2013-0095519 | 8/2013 |
| KR | 10-2013-0138143 | 12/2013 |
| KR | 10-2014-0133081 | 11/2014 |
| KR | 10-2015-0060370 | 6/2015 |
| KR | 10-2015-0089687 | 8/2015 |
| KR | 10-2016-0101600 | 8/2016 |

OTHER PUBLICATIONS

Written Opinion of the ISA for PCT/KR2018/003610 dated Jun. 20, 2018, 7 pages.
Communication pursuant to Article 94(3) EPC dated Dec. 9, 2021 in counterpart European Patent Application No. 18775378.5.
Decision of Patent dated Sep. 28, 2021 in counterpart Korean Patent Application No. 10-2017-0038792 and English-language translation.

* cited by examiner

ELECTRONIC DEVICE AND SCREEN SHARING METHOD OF ELECTRONIC DEVICE

This application is the U.S. national phase of International Application No. PCT/KR2018/003610 filed Mar. 27, 2018 which designated the U.S. and claims priority to KR Patent Application No. 10-2017-0038792 filed Mar. 27, 2017, the entire contents of each of which are hereby incorporated by reference.

Technical Field

Various embodiments of the disclosure relate to a method for sharing a screen and content between electronic devices using a wireline/wireless sharing technology and an electronic device using the method.

BACKGROUND ART

Typically, an electronic device such as a smartphone, a tablet personal computer (PC), a portable multimedia player (PMP), a personal digital assistant (PDA), a laptop PC, and a wearable device may share a screen and content with another electronic device or an electronic appliance equipped with a display such as a television (TV) and refrigerator or a vehicle having a communication function and a display function.

A display of an electronic device supports various resolutions and aspect ratios. Meanwhile, if the resolution and aspect ratio differ between devices, this makes it difficult to share a screen or content in optimal condition therebetween.

SUMMARY

Various embodiments of the disclosure disclose a method for providing an optimized screen to an electronic device as a recipient of video data while a screen and content are being shared between electronic devices and an electronic device using the method.

According to various embodiments of the disclosure, an electronic device includes a communication module, a display, a processor, and a memory configured to store instructions executable by the processor for controlling the communication module to establish a communication link for sharing a screen with an external electronic device and acquire display information of the external electronic device from the external electronic device, generating at least one transfer screen information at least based on display information of the electronic device and the display information of the external electronic device, and determining a resolution or an aspect ratio of the transfer screen information at least based on the aspect ratio of the external electronic device.

According to various embodiments of the disclosure, a screen sharing method of an electronic device includes establishing a communication link for sharing a screen with an external electronic device, acquiring display information of the external electronic device from the external electronic device, generating at least one transfer screen information at least based on display information of the electronic device and the display information of the external electronic device, and determining a resolution or an aspect ratio of the transfer screen information at least based on the aspect ratio of the external electronic device.

The electronic device and screen sharing method thereof according to various embodiments of the disclosure is advantageous in terms of allowing a user to enjoy a video comfortably by providing an optimized screen to an electronic device as a recipient of video data while a screen is shared between electronic devices.

DETAILED DESCRIPTION OF EXAMPLE EMBODIMENTS

Figure 1:
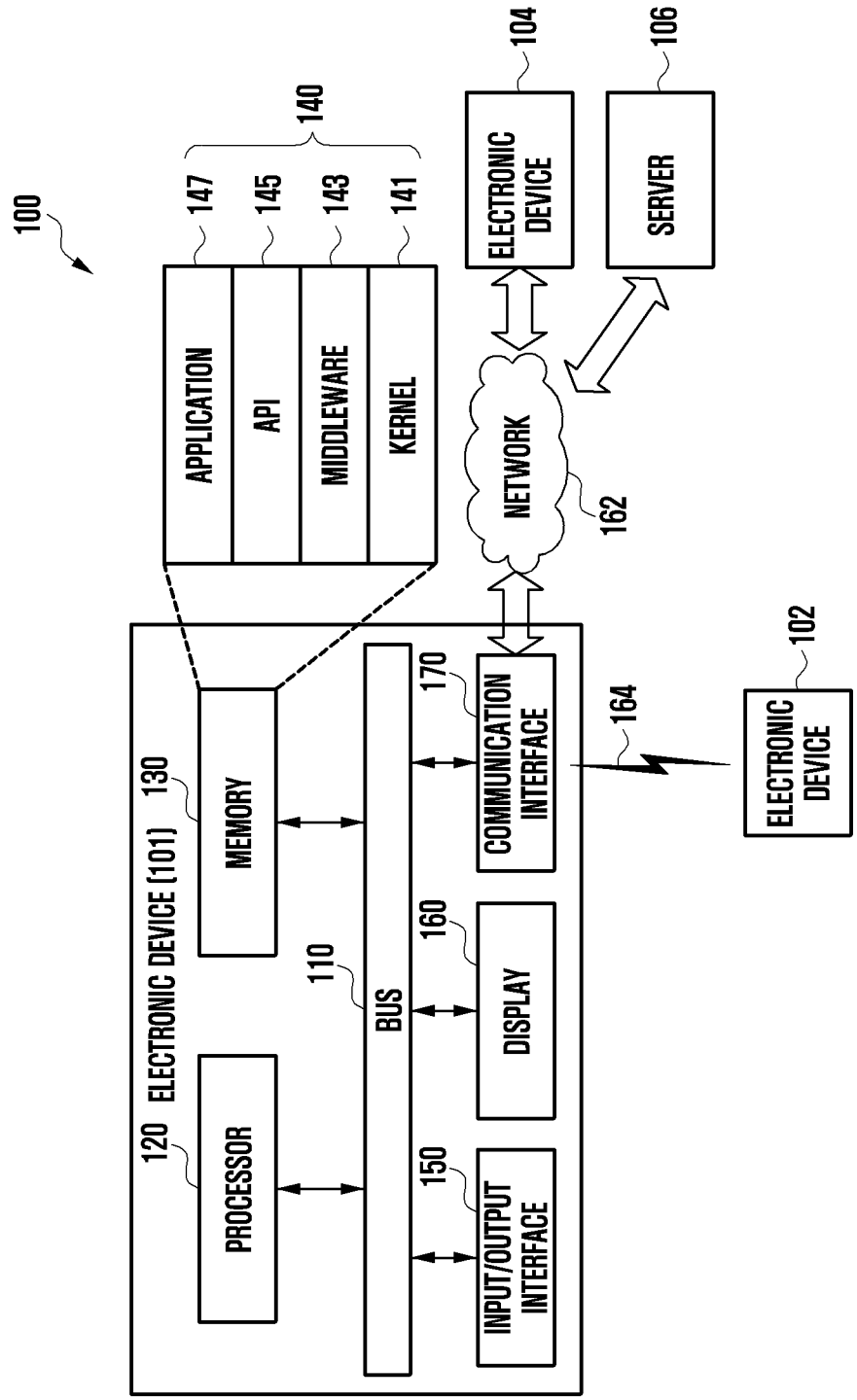
FIG. 1 is a diagram illustrating an electronic device in an network environment according to various embodiments of the disclosure.

Hereinafter, various embodiments of the present document will be described with reference to the accompanying drawings. The various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral. Singular forms are intended to include plural forms unless the context clearly indicates otherwise. In this document, the expressions such as "A or B" or "at least one of A and/or B" may include any or all of combinations of words listed together. The expression "1", "2", "first", or "second" used in various embodiments of the present disclosure may modify various components of the various embodiments but does not limit the corresponding components. When it is stated that a component is "coupled to" or "connected to" another component, the component may be directly coupled or connected to another component or a new component may exist between the component and another component.

In the present document, depending on the situation, the expression such as "~ configured to" can be used interchangeably with "~suitable for", "having ~ the ability to", "~ changed to", "~ made to", "capable of ~", or "designed to ~" in hardware or software. In some situations, the expression such as "a device configured to~" may mean that the device is capable of "doing with" other devices or components. For example, the phrases "a processor configured (or, configured to) perform a, b, and c" may mean that a dedicated processor (e.g., embedded processor) for performing the corresponding operation or a general purpose processor (e.g., CPU or application processor) capable of performing the operations by executing one or more software programs stored in the memory device.

An electronic device according to various embodiments of the present document may include various devices such as, for example, smart phones, tablet PCs, mobile phones, videophones, electronic book readers, desktop PCs, laptop PCs, netbook computers, workstations, a server, a PDA, a portable multimedia player (PMP), an MP3 player, a medical device, a camera, or a wearable device. A wearable device may include at least one of an accessory type such as a watch, a ring, a bracelet, a necklace, a pair of glasses, a contact lens or a head-mounted-device (HMD), a fabric or a garment integral type (e.g., electronic garment), a body attachment type (e.g., a skin pad or a tattoo), or a bio implantable circuit. According to some embodiments, the electronic device may include, for example, at least one of a television, a digital video disk (DVD) player, an audio player, a refrigerator, an air conditioner, a vacuum cleaner, an oven, a microwave oven, a washing machine, an air cleaner, a set top box, a home automation control panel, a media box (e.g, Samsung HomeSync™, Apple TV™, or Google TV™), a game console (e.g., Xbox™, PlayStation™), an electronic dictionary, an electronic key, a camcorder, or an electronic frame.

In another embodiment, the electronic device may include at least one of any of a variety of medical devices (for example, various portable medical measurement devices (e.g., a blood glucose meter, a heart rate meter, a blood pressure meter or a temperature measuring device), a magnetic resonance angiography (MRA), a magnetic resonance imaging (MRI), computed tomography (CT), an imaging device, or an ultrasonic device), navigation devices, global navigation satellite system (GNSS), event data recorder (EDR), flight data recorder (FDR), automobile infotainment device, marine electronic devices (e.g., marine navigation devices, gyro compass, etc.), avionics, security devices, car head units, industrial or home robots, drones, ATMs at financial institutions, points of sale (POS) of stores or Internet Of Things devices (e.g., a light bulb, various sensors, a sprinkler device, a fire alarm, a thermostat, a streetlight, a toaster, a fitness device, a hot water tank, a heater, a boiler, etc.). According to some embodiments, the electronic device may include at least one of a piece of furniture, a building/structure, a part of an automobile, an electronic board, an electronic signature receiving device, a projector, or a variety of measuring devices (e.g., Gas, or radio wave measuring instruments, etc.). In various embodiments, the electronic device is flexible or may be a combination of two or more of the various devices described above. The electronic device according to the embodiment of the present document is not limited to the above-described devices. In this document, the term "user" used in various embodiments may refer to a person who uses an electronic device or a device (for example, an artificial intelligence electronic device) which uses an electronic device.

FIG. 1 illustrates a network environment 100 including an electronic device 101 according to various embodiments of the present disclosure. The electronic device 101 includes a bus 110, a processor 120, a memory 130, a input/output interface 150, a display 160 and a communication interface 170. According to some embodiments, the electronic device 101 may omit at least one of the components, or may additionally comprise other components. The bus 110 may be a circuit connecting the above described components 110 to 170 and transmitting communication (for example, a control message or data) between the above described components. The processor 120 may include one or more of a central processing unit (CPU), an application processor (AP), or a communications processor (CP). The processor 120 may execute operations or data processing related to control and/or communicate at least one the other components of the electronic device (101).

The memory 130 may include volatile and/or non-volatile memory. For example, the memory 130 may store instructions or data related to at least one other component of the electronic device 101. According to one embodiment, the memory 130 may store software and/or programs 140. For example, the program 140 may include a kernel 141, a middleware 143, an application programming interface (API) 145, and/or an application program (or application) 147. At least one of the kernel 141, middleware 143, or API 145 may be referred to as an operating system. For example, the kernel 141 controls or manages system resources (e.g., bus 110, processor 120, or memory 130, etc.) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests by using a method of assigning a priority. For example, the middleware 143 performs a control for the operation requests by using a method of assigning a priority by which system resources (for example, the bus 110, the processor 120, the memory 130 and the like) of the electronic device 100 can be used, to the application 147. The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user or external device, and transfer the received command and/or data to the components of the electronic device 101. The input/output interface 150 can output the received command and/or data to the components of the user or the external device.

The display 160 may include a display device such as a liquid crystal display (LCD), a light emitting diode (LED) display, an organic light emitting diode (OLED) display, or a microelectromechanical system (MEMS) display, or an electronic paper display. The display 160 may display various content (e.g., text, images, video, icons, and/or symbols, etc.) to a user. The display 160 may include a touch screen and may receive a touch, gesture, proximity, or hovering input using an electronic pen or a portion of a user's body. The communication interface 170 connects communication between the electronic device 100 and the external device (e.g., electronic device 102, 104 or server 106). For example, the communication interface 170 may access a network 162 through wireless or wired communication to communicate with the external device (e.g., the second electronic device 104 or server 106).

The wireless communication may include, for example, at least one of LTE, LTE-A (LTE Advance), code division multiple access (CDMA), wideband CDMA (WCDMA), universal mobile telecommunications system (UNITS), WiBro System for Mobile Communications). According to one embodiment, the wireless communication may include, for example, at least one of wireless fidelity (WiFi), Bluetooth, Bluetooth low power (BLE), Zigbee, near field communication, Magnetic Secure Transmission, Frequency (RF), or body area network (BAN). According to one example, wireless communication may include Global navigation satellite system (GNSS). For example, the GNSS may be a Global Positioning System (GPS), a Global Navigation Satellite System (Glonass), a Beidou Navigation Satellite System (Beidou), or a Galileo, the European global satellite-based navigation system. Hereinafter, the term 'GPS' can be used interchangeably with the term 'GNSS' in this document. The wired communication may include, for example, at least one of a universal serial bus (USB), a high definition multimedia interface (HDMI), a recommended standard 232 (RS-232), a power line communication, or a plain old telephone service (POTS). The network 162 may include at least one of a telecommunications network, a computer network (e.g., LAN or WAN), the Internet, or a telephone network Each of the first and second external electronic devices 102 and 104 may be the same or a different kind of device as the electronic device 101. According to various embodiments, all or a portion of the operations performed in the electronic device 101 may be performed in another electronic device or multiple electronic devices (e.g., electronic devices 102, 104, or server 106). According to one embodiment, in the event that the electronic device 101 has to perform certain functions or services automatically or upon request, the electronic device 101 may request other devices to perform at least some of the functions associated therewith instead of performing the function or service itself. Other electronic devices (e.g., the electronic devices 102 and 104, or server 106) may execute the requested function or additional function and transmit the results to electronic device 101. The electronic device 101 can directly or additionally process the received result to provide the requested function or service. For this purpose, for example, cloud computing, distributed computing, or client-server computing technology may be used.

Figure 2:
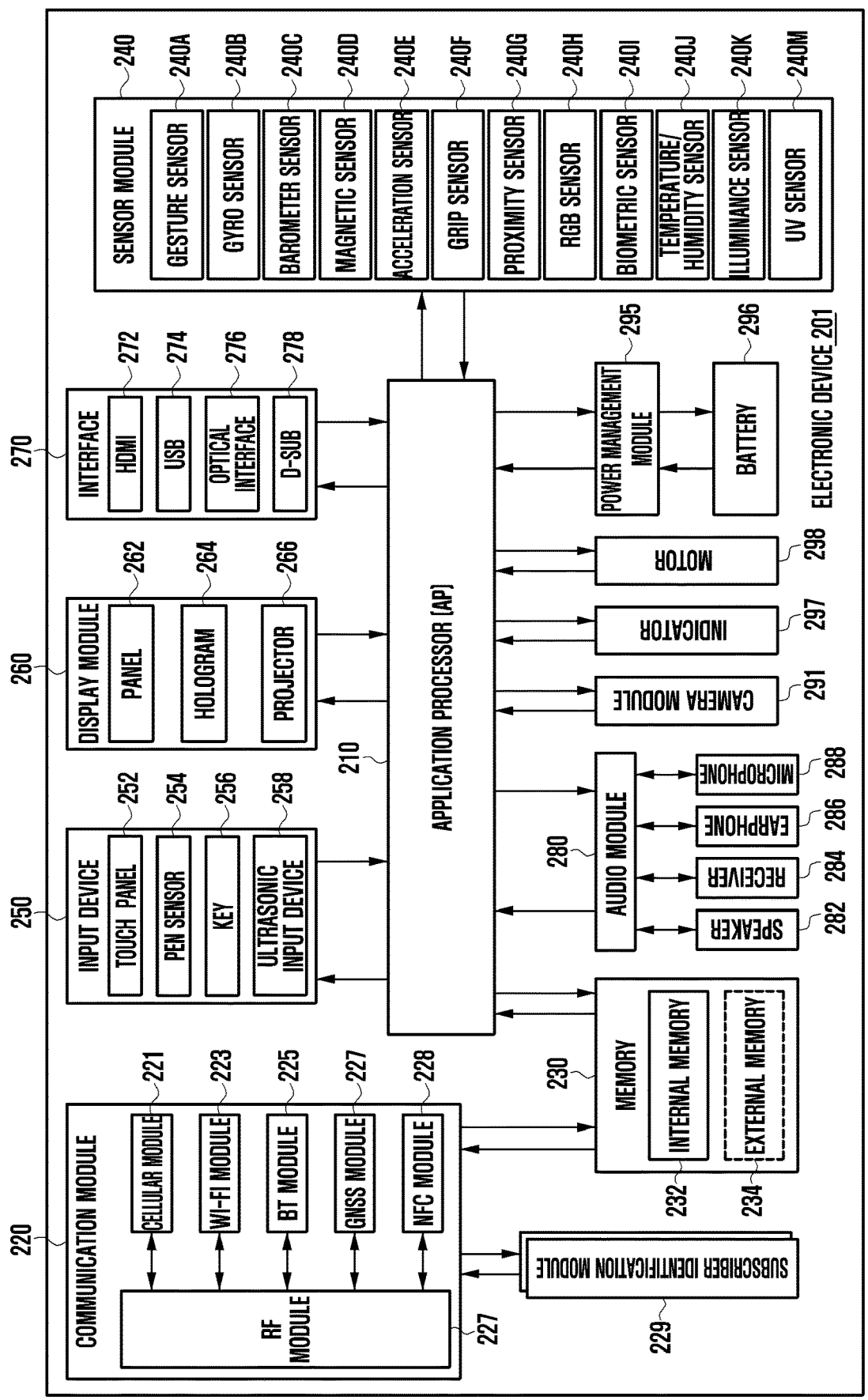
FIG. 2 is a block diagram illustrating an electronic device according to various embodiments of the disclosure.

FIG. 2 is a block diagram of an electronic device 201 according to various embodiments of the present disclosure. The electronic device 201 may configure, for example, a whole or a part of the electronic device 101 illustrated in FIG. 1. The electronic device 201 includes one or more processors (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. For example, the processor 210 may operate an operating system (OS) or an application program to control a plurality of hardware or software components connected to the processor 210, and may perform various data processing and operations. The processor 210 may be implemented by, for example, a system on chip (SoC). According to an embodiment, the processor 210 may further include a graphics processing unit (GPU) and/or an image signal processor. The processor 210 may include at least some of the components shown in FIG. 2 (e.g., cellular module 221). The processor 210 may load and process instructions or data received from at least one of the other components (e.g., non-volatile memory) and store the processed data in non-volatile memory.

May have the same or similar configuration as communication module 220 (e.g., communication interface 170). The communication module 220 may include, for example, a cellular module 221, a WiFi module 223, a Bluetooth module 225, a GNSS module 227, an NFC module 228 and an RF module 229 have. The cellular module 221 may provide, for example, voice calls, video calls, text services, or Internet services through a communication network. According to an embodiment, the cellular module 221 may distinguish and authenticate the electronic device 201 within the communication network by using the subscriber identity module (e.g., a SIM card) 224. According to an embodiment, the cellular module 221 performs at least some of the functions which can be provided by the processor 210. According to one embodiment, the cellular module 221 may include a communications processor (CP). At least some (e.g., two or more) of the cellular module 221, the WiFi module 223, the Bluetooth module 225, the GNSS module 227, or the NFC module 228 may be included in one integrated chip (IC) or IC package according to one embodiment. The RF module 229 transmits/receives data, for example, an RF signal. The RF module 229 may include, for example, a transceiver, a Power Amp Module (PAM), a frequency filter, a Low Noise Amplifier (LNA) or the like. According to another embodiment, at least one of the cellular module 221, the WiFi module 223, the Bluetooth module 225, the GNSS module 227, or the NFC module 228 transmits/receives an RF signal through a separate RF module. The SIM card 224 is a card including a Subscriber Identification Module or an embedded SIM. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a dynamic Random Access Memory (DRAM), a static RAM (SRAM), a synchronous dynamic RAM (SDRAM), and the like), and a non-volatile Memory (for example, a one time programmable Read Only Memory (OTPROM), a programmable ROM (PROM), an erasable and programmable ROM (EPROM), an electrically erasable and programmable ROM (EEPROM), a mask ROM, a flash ROM, a NAND flash memory, a hard drive, a solid state drive (SSD). The external memory 234 may include a flash drive, for example, a Compact Flash (CF), a Secure Digital (SD), a Micro Secure Digital (Micro-SD), a Mini Secure Digital (Mini-SD), an extreme Digital (xD), a multimedia card (MMC), or a memory stick. The external memory 234 may be functionally connected to the electronic device 201 through various interfaces.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240. According to some embodiments, to control the sensor module 240 while the processor 210 is in the sleep state, the electronic device 201 further includes a processor configured as part of the processor 210 or a processor that is separately configured from the processor 210.

The input device 250 may include, for example, a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. The touch panel 252 may further include a tactile layer. In this event, the touch panel 252 provides a tactile reaction to the user. For example, the (digital) pen sensor 254 may be part of the touch panel or may include a separate recognition sheet. The key 256 may include, for example, a physical button, an optical key, or a keypad. The ultrasonic input device 258 is a device which can detect an acoustic wave by a microphone (for example, microphone 288) of the electronic device 200 through an input means generating an ultrasonic signal to identify data and can perform wireless recognition.

The display 260 (for example, display 160) includes a panel 262, a hologram device 264, and a projector 266. The panel 262 may be implemented to be, for example, flexible, transparent, or wearable. The panel 262 may be configured by the touch panel 252 and one module. According to an embodiment, the panel 262 may include a pressure sensor (or force sensor) capable of measuring the intensity of the pressure on the user's touch. The pressure sensor may be integrated with the touch panel 252 or may be implemented by one or more sensors separate from the touch panel 252. The hologram device 264 shows a stereoscopic image in the air by using interference of light. The projector 266 projects light on a screen to display an image. For example, the screen may be located inside or outside the electronic device 200. The interface 270 may include, for example, an HDMI 272, a USB 274, an optical interface 276, or a D-sub (D-subminiature) 278. The interface 270 may be included, for example, in the communication interface 170 shown in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like. The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp). The power managing module 295 manages power of the electronic device 200. The power managing module 295 may include, for example, a Power Management Integrated Circuit (PMIC), a charger Integrated Circuit (IC), or a battery or fuel gauge. The PMIC may have a wired and/or wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added. The battery gauge measures, for example, a remaining quantity of the battery 296, or a voltage, a current, or a temperature during charging. The battery 296 may include a rechargeable battery or a solar battery.

The indicator 297 shows particular statuses of the electronic device 201 or a part (for example, the processor 210) of the electronic device 201, for example, a booting status, a message status, a charging status and the like. The motor 298 converts an electrical signal to a mechanical vibration, and can generate vibration, haptic effects, and the like. The electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), mediaFlo™ or the like. Each of the components described in this document may be composed of one or more components, and the name of the component may be changed according to the type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
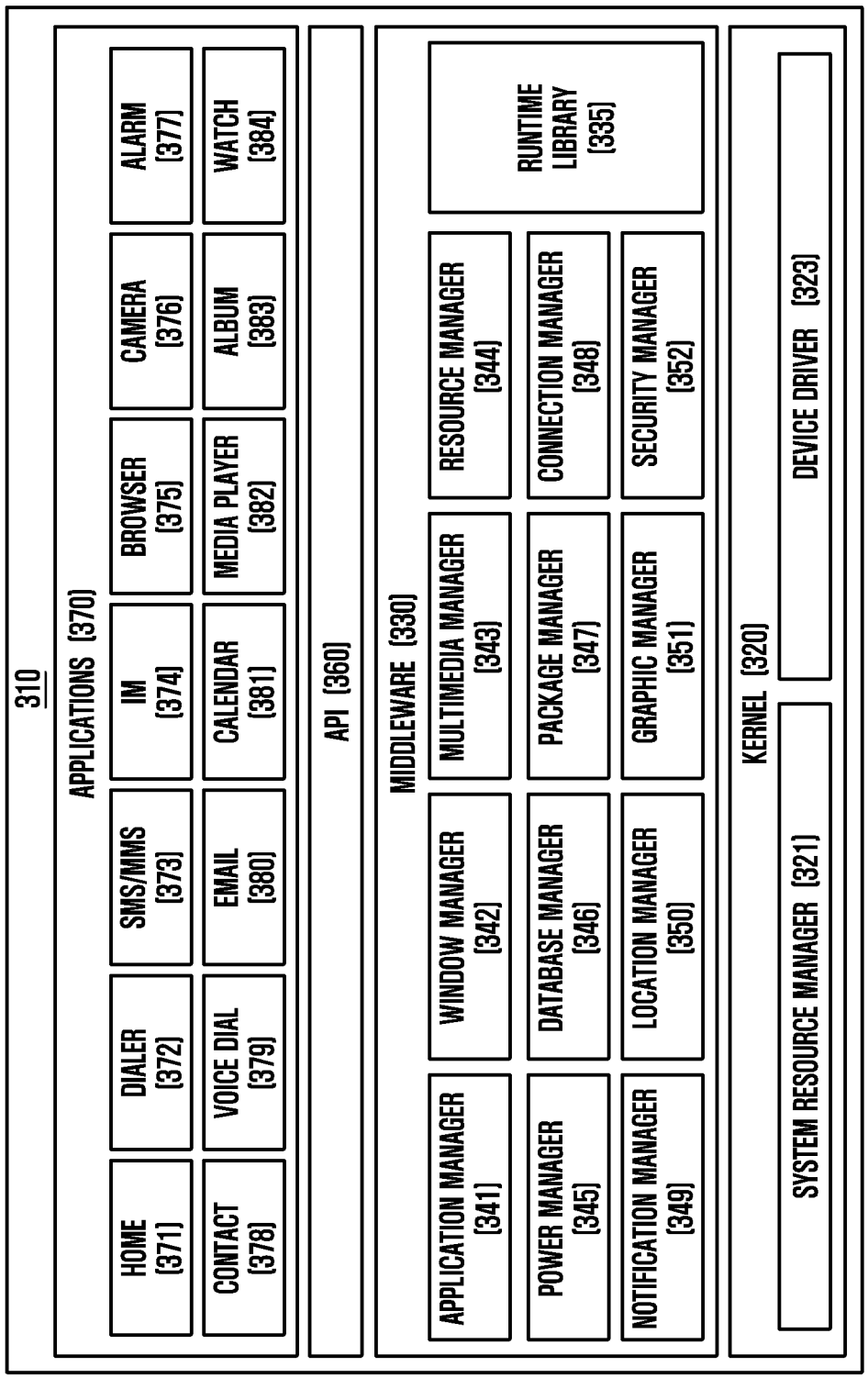
FIG. 3 is a block diagram illustrating a program module according to various embodiments of the disclosure.

FIG. 3 is a block diagram of a programming module according to an embodiment. The programming module 310 may include an Operating System (OS) controlling resources related to the electronic device (for example, electronic device 101) or various applications (for example, applications 370) driving on the OS. For example, the OS may be Android™, iOS™, Window™, Symbian™, Tizen™, Bada™ or the like. Referring to FIG. 3, the programming module 310 includes a kernel 320, a middleware 330, an Application Programming Interface (API) 360, and applications 370. At least a portion of the program module 310 is preloaded on the electronic device or downloadable from an external electronic device (e.g., electronic device 102, 104, server 106, etc.).

The kernel 320 (for example, kernel 141) includes a system resource manager 321 and a device driver 323. The system resource manager 321 performs a system resource control, allocation, and recall. According to an embodiment, the system resource manager 321 may include, for example, a process manager, a memory manager, and a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver. The middleware 330 provides various functions through the API 360 to allow the application 370 to provide a function required in common by the applications 370, or use limited system resources within the electronic device. According to an embodiment, the middleware 310 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370. The power manager 345 may manage, for example, the capacity or power of the battery and provide the power information necessary for the operation of the electronic device. According to an embodiment, the power manager 345 operates together with a Basic Input/Output System (BIOS) The database manager 346 manages generation, search, and change of a database to be used by at least one of the applications 370. The package manager 347 manages an installation or an update of an application distributed in a form of a package file.

The connection manager 348 manages, for example, a wireless connection. The notification manager 349 displays or notifies a user of an event such as an arrival message, an appointment, a proximity alarm or the like. The location manager 350 may manage, for example, location information of the electronic device. The graphic manager 351 may manage a graphic effect provided to the user or a user interface related to the graphic effect. The security manager 352 provides a general security function required for a system security or a user authentication. According to an embodiment, the middleware 330 may include a telephony manager for managing a voice of the electronic device or a video call function. The middleware 330 may provide a module specified for each type of operating system to provide a differentiated function. The middleware 330 may dynamically delete some of the conventional components or add new components. The API 360 (for example, API 145) is a set of API programming functions, and may be provided with a different configuration according to an operating system. For example, in Android or iOS, a single API set may be provided for each platform. In Tizen, two or more API sets may be provided.

The applications 370 may include a home application 371, a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, a clock application 384, a healthcare (e.g., measuring exercise or blood sugar) application, or an environmental information (e.g., pressure, humidity, or temperature information) application. According to an embodiment, the application 370 may include an information exchange application capable of supporting the exchange of information between the electronic device and the external electronic device. The information exchange application may include, for example, a notification relay application for communicating specific information to an external electronic device, or a device management application for managing an external electronic device. For example, the notification relay application may transmit notification information generated in another application of the electronic device to an external electronic device, or may receive notification information from an external electronic device and provide the notification information to the user. The device management application may, for example, install, delete, or update the functions such as turning on/off the external electronic device itself (or some component) or adjusting the brightness (or resolution) of the display of the external electronic device of an external electronic device that communicates with the electronic device, or an application that operates on the external electronic device. According to an embodiment, the application 370 may include an application (e.g., a healthcare application of a mobile medical device) designated according to the attributes of the external electronic device. According to an embodiment, the application 370 may include an application received from an external electronic device. At least some of the program modules 310 may be implemented (e.g., executed) in software, firmware, hardware (e.g., processor 210), or a combination of at least two of the same, and may comprise modules, programs, routines, instruction sets or processes for performing one or more functions.

Figure 4A:
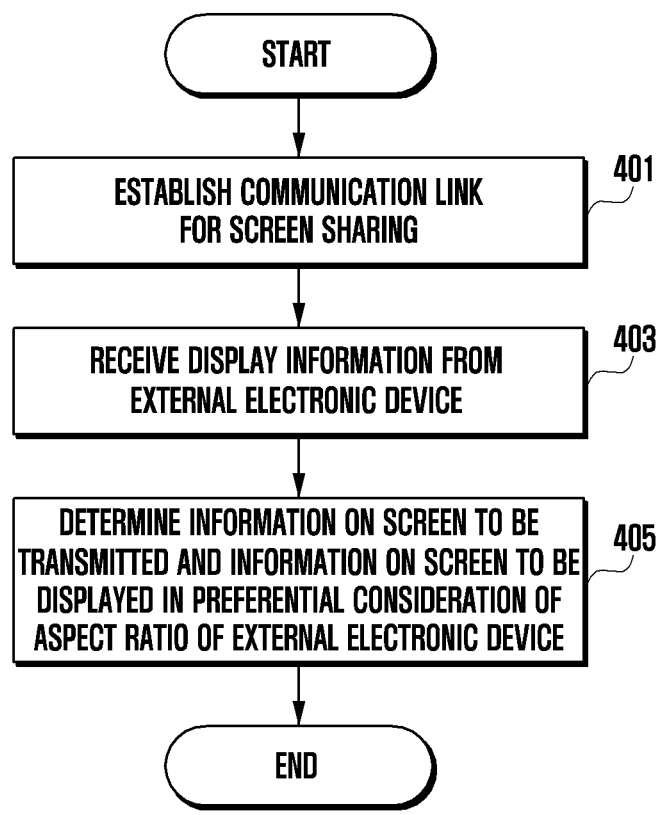
FIGS. 4A and 4B are flowcharts illustrating screen sharing methods of an electronic device according to various embodiments of the disclosure.

FIG. 4A is a flowchart illustrating a screen sharing method of an electronic device 201 according to various embodiments of the disclosure.

At step 401, the electronic device 201 may establish a communication link with an external electronic device for sharing a screen under the control of the processor 210.

The external electronic device may be identical with the electronic device (e.g., electronic device 101 in FIG. 1 and electronic device 201 in FIG. 2). The external electronic device may include a communication function (e.g., communication module 220 in FIG. 2) and a display (e.g., display 260 in FIG. 2). The external electronic device may be a home appliance (such as a TV, refrigerator, and washing machine), a virtual reality (VR) headset, or a vehicle including a display function and a communication function. The external electronic device may support wireline and/or wireless communication functions and include at least one of an HDMI (HDMI 272 in FIG. 2), a USB interface (e.g., USB 274 in FIG. 2), an optical interface (e.g., optical interface 276 in FIG. 2), a D-subminiature (D-SUB) interface (e.g., D-SUB 278 in FIG. 2), a digital visual interface (DVI), or a display port as its wireline communication interface. The external electronic device may also include at least one of a cellular module (e.g., cellular module 221 in FIG. 2), a Wi-Fi module (e.g., Wi-Fi module 223 in FIG. 2), or the Bluetooth module (e.g., BT module 225 in FIG. 2) as its wireless communication interface.

At step 401, the electronic device 201 may establish a communication link via the wireline communication interface and/or wireless communication interface for sharing a screen with the external electronic device under the control of the processor 210. For example, the electronic device 201 may establish a wireline communication link with the external device using the HDMI (e.g., HDMI 272 in FIG. 2), the USB (e.g., USB 274 in FIG. 2), or the display port. For example, the electronic device 201 may establish at least one of a Wi-Fi miracast link, a Google Cast™ link, or a mirror link with the external electronic device using at least one of the cellular module (e.g., cellular module 221 in FIG. 2), the Wi-Fi module (e.g., Wi-Fi module 223 in FIG. 2), or the Bluetooth module (e.g., BT module 225 in FIG. 2).

At step 401, the electronic device 201 may execute an application for sharing a screen in the middle of establishing a communication link with the external electronic device for sharing the screen via the wireline communication interface and/or wireless communication interface under the control of the processor 210. For example, the electronic device 201 may perform a screen sharing operation using the screen sharing application as to be described later. The screen sharing application may be the Wi-Fi miracast, Google Cast™, or mirror link.

After establishing a communication link for sharing a screen with the external electronic device, the electronic device 201 may receive, at step 403, display information of the external electronic device from the external electronic device through the wireline interface and/or the wireless interface.

The display information may include resolutions supported by the external electronic device and an aspect ratio of the external electronic device. For example, the display information may include extended display identification data (EDID) information. The display information may include video format information (e.g., Wi-Fi display (WFD) video format of Wi-Fi miracast). The video format information may include at least one display-related parameter. For example, the WFD video format information may include wfd video format parameters or wfd 2 video format parameters.

In the case where the electronic device 201 and the external electronic device communicate through a wireline communication link, the display information may be exchanged through a display data channel (DDC).

In the case where the electronic device 201 and the external electronic device communicate through a wireless communication link, the video format information (e.g., WFD video format) may be exchanged via a specific protocol (e.g., real time streaming protocol).

After establishing a communication link for sharing a screen with the external electronic device, the electronic device 201 may request for display information of the external electronic device and receive the display information of the external electronic device from the external electronic device, at step 403, in response to the request through the wireline interface and/or wireless interface.

At step 405, the electronic device 201 may determine information on the screen to be transmitted to the external electronic device and information on the screen to be displayed on the electronic device in preferential consideration of the aspect ratio of the external electronic device based on the display information of the external electronic device under the control of the processor 210.

At step 405, the electronic device 201 may determine the information on the screen to be transmitted to the external electronic device and the information on the screen to be displayed on the electronic device by selecting a maximum resolution among the resolutions supported by the external electronic device, while considering the aspect ratio of the external electronic device preferentially, under the control of the processor 210. The information on the screen to be displayed may be identical with the information on the screen to be transmitted. The information on the screen to be displayed may be information indicative of a change of the aspect ratio of the electronic device according to the aspect ratio of the external electronic device.

The electronic device 201 may transmit data related to the screen displayed on the display 260 to the external electronic device through the wireline communication interface and/or wireless communication interface based on the information on the screen to be transmitted and display the screen on the display 260 based on the information on the screen to be displayed under the control of the processor 210.

In the case of transmitting the data related to the screen displayed on the display 260 to the external electronic device through the wireline communication interface and/or wireless communication interface, the electronic device 201 may selectively encode or not encode the data related to the screen displayed on the display 260 before transmission.

Figure 4B:
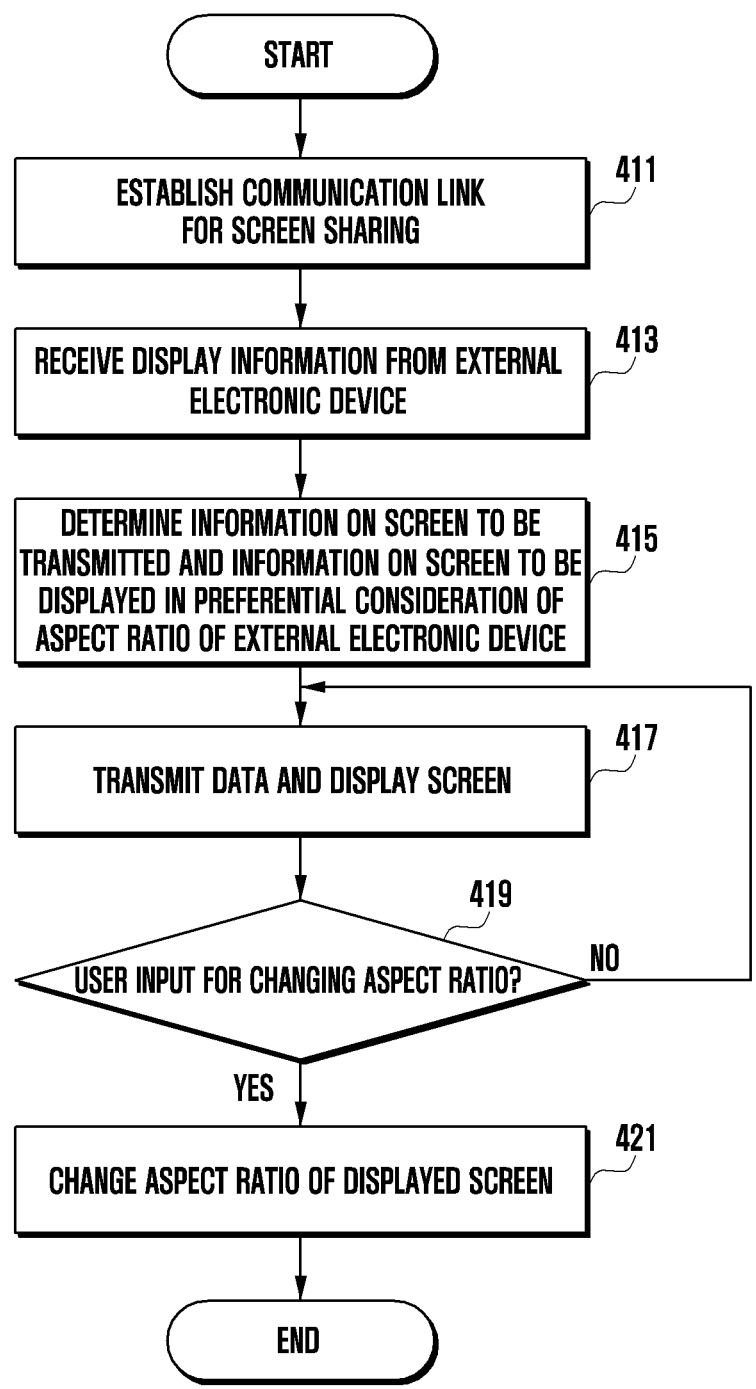

FIG. 4B is a flowchart illustrating a screen sharing method of an electronic device 201 according to various embodiments of the disclosure.

At step 411, the electronic device may establish a communication link for sharing a screen with an external electronic device under the control of the processor 210.

The external electronic device may be identical with the electronic device (e.g., electronic device 101 in FIG. 1 and electronic device 201 in FIG. 2). The external electronic device may include a communication function (e.g., communication module 220 in FIG. 2) and a display (e.g., display 260 in FIG. 2). The external electronic device may be a home appliance (such as a TV, refrigerator, and washing machine), a virtual reality (VR) headset, or a vehicle including a display function and a communication function. The external electronic device may support wireline and/or wireless communication functions and include at least one of an HDMI (HDMI 272 in FIG. 2), a USB interface (e.g., USB 274 in FIG. 2), an optical interface (e.g., optical interface 276 in FIG. 2), a D-subminiature (D-SUB) interface (e.g., D-SUB 278 in FIG. 2), a digital visual interface (DVI), or a display port as its wireline communication interface. The external electronic device may also include at least one of a cellular module (e.g., cellular module 221 in FIG. 2), a Wi-Fi module (e.g., Wi-Fi module 223 in FIG. 2), or the Bluetooth module (e.g., BT module 225 in FIG. 2) as its wireless communication interface.

At step 411, the electronic device 201 may establish a communication link via the wireline communication interface and/or wireless communication interface for sharing a screen with the external electronic device under the control of the processor 210. For example, the electronic device 201 may establish a wireline communication link with the external device using the HDMI (e.g., HDMI 272 in FIG. 2), the USB (e.g., USB 274 in FIG. 2), or the display port. For example, the electronic device 201 may establish at least one of a Wi-Fi miracast link, a Google Cast™ link, or a mirror link with the external electronic device using at least one of the cellular module (e.g., cellular module 221 in FIG. 2), the Wi-Fi module (e.g., Wi-Fi module 223 in FIG. 2), or the Bluetooth module (e.g., BT module 225 in FIG. 2).

At step 411, the electronic device 201 may execute an application for sharing a screen in the middle of establishing a communication link with the external electronic device for sharing the screen via the wireline communication interface and/or wireless communication interface under the control of the processor 210. For example, the electronic device 201 may perform a screen sharing operation using the screen sharing application as to be described later. The screen sharing application may be the Wi-Fi miracast, Google Cast™, or mirror link.

After establishing a communication link for sharing a screen with the external electronic device, the electronic device 201 may receive, at step 413, display information of the external electronic device from the external electronic device through the wireline interface and/or the wireless interface under the control of the processor 210.

The display information may include resolutions supported by the external electronic device and aspect ratio of the external electronic device. For example, the display information may include extended display identification data (EDID) information. The display information may include video format information (e.g., Wi-Fi display (WFD) video format of Wi-Fi miracast). The video format information may include at least one display-related parameter. For example, the WFD video format information may include wfd video format parameters or wfd 2 video format parameters.

In the case where the electronic device 201 and the external electronic device communicate through a wireline communication link, the display information may be exchanged through a display data channel (DDC).

In the case where the electronic device 201 and the external electronic device communicate through a wireless communication link, the video format information (e.g., WFD video format) may be exchanged via a specific protocol (e.g., real time streaming protocol (RTSP)).

After establishing a communication link for sharing a screen with the external electronic device, the electronic device 201 may request for display information of the external electronic device and receive the display information of the external electronic device from the external electronic device, at step 413, in response to the request through the wireline interface and/or wireless interface.

At step 415, the electronic device 201 may determine information on the screen to be transmitted to the external electronic device and information on the screen to be displayed on the electronic device in preferential consideration of the aspect ratio of the external electronic device based on the display information of the external electronic device under the control of the processor 210.

At step 415, the electronic device 201 may determine the information on the screen to be transmitted to the external electronic device and the information on the screen to be displayed on the electronic device by selecting a maximum resolution among the resolutions supported by the external electronic device, while considering the aspect ratio of the external electronic device preferentially, under the control of the processor 210. The information on the screen to be displayed may be identical with the information on the screen to be transmitted. The information on the screen to be displayed may be information indicative of a change of the aspect ratio of the electronic device according to the aspect ratio of the external electronic device.

At step 417, the electronic device 201 may transmit the data on the screen display on the display 260 to the external electronic device through the wireline communication link and/or wireless communication link based on the information on the screen to be transmitted and display the screen on the display 260 based on the information on the screen to be displayed under the control of the processor 210. In the case of transmitting, at step 417, the data related to the screen displayed on the display 269 through the wireline communication interface and/or wireless communication interface, the electronic device 201 may selectively encode or not encode the data before transmission.

At step 419, the electronic device may determine whether a user input for changing the aspect ratio is received under the control of the processor 210. For example, the electronic device 201 may include a touchscreen implemented by integrating the display and a touch panel. The electronic device 201 may receive a user input for changing the aspect ratio through the touchscreen.

If no user input for changing the aspect ratio is received at step 419, the procedure goes back to step 417.

If a user input for changing the aspect ratio is received at step 419, the procedure goes to step 421.

Upon receipt of the user input for changing the aspect ratio, the electronic device 201 may change, at step 421, the aspect ratio of the screen displayed on the display 260.

Figure 5:
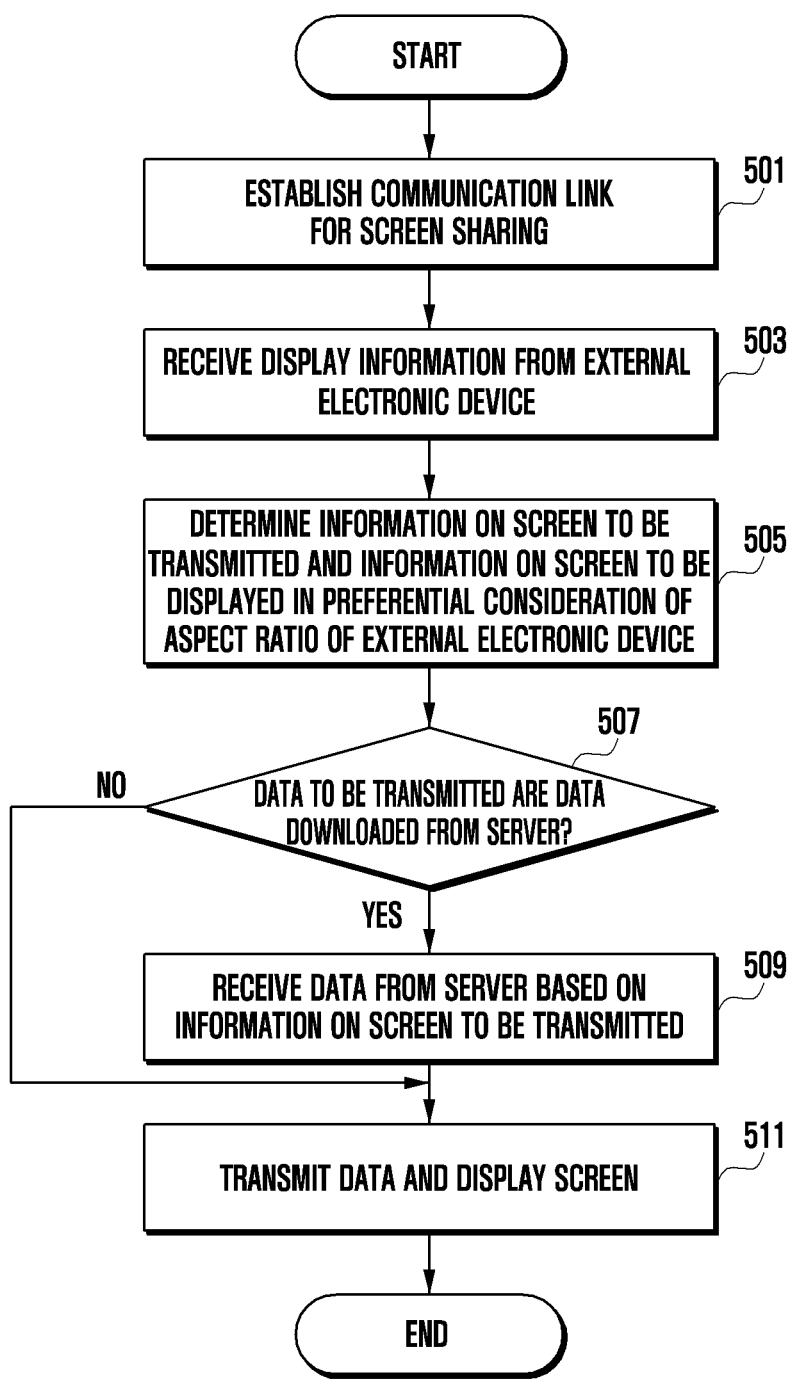
FIG. 5 is a flowchart illustrating a screen sharing method of an electronic device 201 according to various embodiments of the disclosure.

FIG. 5 is a flowchart illustrating a screen sharing method of an electronic device 201 according to various embodiments of the disclosure.

At step 501, the electronic device may establish a communication link for sharing a screen with an external electronic device under the control of the processor 210.

The external electronic device may be identical with the electronic device (e.g., electronic device 101 in FIG. 1 and electronic device 201 in FIG. 2). The external electronic device may include a communication function (e.g., communication module 220 in FIG. 2) and a display (e.g., display 260 in FIG. 2). The external electronic device may be a home appliance (such as a TV, refrigerator, and washing machine), a virtual reality (VR) headset, or a vehicle including a display function and a communication function. The external electronic device may support wireline and/or wireless communication functions and include at least one of an HDMI (HDMI 272 in FIG. 2), a USB interface (e.g., USB 274 in FIG. 2), an optical interface (e.g., optical interface 276 in FIG. 2), a D-subminiature (D-SUB) interface (e.g., D-SUB 278 in FIG. 2), a digital visual interface (DVI), or a display port as its wireline communication interface. The external electronic device may also include at least one of a cellular module (e.g., cellular module 221 in FIG. 2), a Wi-Fi module (e.g., Wi-Fi module 223 in FIG. 2), or the Bluetooth module (e.g., BT module 225 in FIG. 2) as its wireless communication interface.

At step 501, the electronic device 201 may execute an application for sharing a screen in the middle of establishing a communication link with the external electronic device for sharing the screen via the wireline communication interface and/or wireless communication interface under the control of the processor 210. For example, the electronic device 201 may establish a wireline communication link with the external electronic device using the HDMI (e.g., HDMI 272 in FIG. 2), the USB interface (e.g., USB 274 in FIG. 2), or the display port. For example, the electronic device 201 may establish at least one of a Wi-Fi miracast link, a Google Cast™ link, or a mirror link with the external electronic device using at least one of the cellular module (e.g., cellular module 221 in FIG. 2), the Wi-Fi module (e.g., Wi-Fi module 223 in FIG. 2), or the Bluetooth module (e.g., BT module 225 in FIG. 2).

At step 501, the electronic device 201 may execute an application for sharing a screen in the middle of establishing a communication link with the external electronic device for sharing the screen via the wireline communication interface and/or wireless communication interface under the control of the processor 210. For example, the electronic device 201 may perform a screen sharing operation using the screen sharing application as to be described later. The screen sharing application may be the Wi-Fi miracast, Google Cast™, or mirror link.

After establishing a communication link for sharing a screen with the external electronic device, the electronic device 201 may receive, at step 503, display information of the external electronic device from the external electronic device through the wireline interface and/or the wireless interface under the control of the processor 210.

The display information may include resolutions supported by the external electronic device and an aspect ratio of the external electronic device. For example, the display information may include extended display identification data (EDID) information. The display information may include video format information (e.g., Wi-Fi display (WFD) video format of Wi-Fi miracast). The video format information may include at least one display-related parameter. For example, the WFD video format information may include wfd video format parameters or wfd 2 video format parameters.

In the case where the electronic device 201 and the external electronic device communicate through a wireline communication link, the display information may be exchanged through a display data channel (DDC); in the case where the electronic device 201 and the external electronic device communicate through a wireless communication link, the video format information (e.g., WFD video format) may be exchanged via a specific protocol (e.g., real time streaming protocol (RTSP)).

In various embodiments, in the case where the electronic device 201 and the external electronic device communicate through a wireless communication link, they may exchange display information as supplementary information according to a wireless communication scheme (e.g., operation as specified in a communication standard).

After establishing a communication link for sharing a screen with the external electronic device, the electronic device 201 may request for display information of the external electronic device and receive the display information of the external electronic device from the external electronic device, at step 503, in response to the request through the wireline interface and/or wireless interface.

At step 505, the electronic device 201 may determine information on the screen to be transmitted to the external electronic device and information on the screen to be displayed on the electronic device in preferential consideration of the aspect ratio of the external electronic device based on the display information of the external electronic device under the control of the processor 210.

At step 505, the electronic device 201 may determine the information on the screen to be transmitted to the external electronic device and the information on the screen to be displayed on the electronic device by selecting the best (e.g., maximum) resolution among the resolutions supported by the external electronic device, while considering the aspect ratio of the external electronic device preferentially, under the control of the processor 210. The information on the screen to be displayed may be identical with the information on the screen to be transmitted. The information on the screen to be displayed may be information indicative of a change of the aspect ratio of the electronic device according to the aspect ratio of the external electronic device.

At step 507, the electronic device 201 may determine whether the data to be transmitted to the external device are data downloaded from a server (e.g., server 106 in FIG. 1). The data may be a video downloaded from the server in the form of a streaming service. For example, the data being downloaded from the server may be a streaming video provided by a Youtube™, Facebook™, or Samsung VR™ site.

If it is determined at step 507 that the data to be transmitted to the external electronic device are not data downloaded from the server (e.g., server 106 in FIG. 1), the procedure may go to step 511 under the control of the processor 210.

If it is determined at step 507 that the data to be transmitted to the external electronic device are data downloaded from the server (e.g., server 10 in FIG. 1), the procedure may go to step 509 under the control of the processor 210.

At step 509, the electronic device 201 may request to the server (e.g., server 106 in FIG. 1) for data based on the screen information to be transmitted and receive data transmitted by the server under the control of the processor 210.

At step 511, the electronic device 201 may transmit data related to the screen displayed on the display 260 to the external electronic device through the wireline communication interface and/or wireless communication interface based on the information on the screen to be transmitted and display the screen on the display 260 based on the information of the screen to be displayed, under the control of the processor 210. In the case of transmitting the data on the screen displayed on the display 260 to the external electronic device through the wireline communication interface and/or wireless communication interface based on the information on the screen to be transmitted at step 511 under the control of the processor 210, the electronic device 201 may selectively encode or not encode the data related to the screen displayed on the display 260 before transmission.

For example, at steps 509 and 511, the electronic device 201 may receive a content of a video with a large view angle (e.g., polyhedron-mapped 360-degree video streaming service) from the server (e.g., server 106 in FIG. 1) in a streaming fashion and transmit the content to the external electronic device.

In the case where the server (e.g., server 106 in FIG. 1) transmits data to the electronic device 201 in an adaptative quality streaming scheme such as MPEG-DASH and HLS, the electronic device 201 may request for view angle information (e.g., degree of view angle) of the data to be received from the server (e.g., server 106 in FIG. 1) based on the aspect ratio of the external electronic device. In the case of requesting for view angle information (e.g., degree of view angle) of the data to be received from the server (e.g., server 106 in FIG. 1) based on the aspect ratio of the external electronic device, the electronic device 201 may use a data requesting unit (e.g., DASH controller) included in the electronic device 201. The data requesting unit (e.g., DASH controller) may be at least part of the processor 210 or a component of another electronic device 210 that is not associated with the processor 210.

The polyhedron-mapped 360-degree video streaming service may provide contents or data supporting a 360-degree video by way of example.

The server (e.g., server 106 in FIG. 1) may store the 360-degree video so as to be mapped to a virtual 3-dimensional projection space (e.g., polyhedron), and the server (e.g., server 106 in FIG. 1) may establish a channel per 3-dimensional projection space to provide a video streaming service. For example, the virtual 3-dimensional projection space may be designed in the forms of various polyhedra such as a regular tetrahedron, a regular octahedron, and a regular icosahedron; the server may establish streaming channels for video data mapped to respective sides of the polyhedron and transmit the video data through streaming channels.

At steps 509 and 511, the electronic device 201 may request, to the server (e.g., server 106 in FIG. 1) providing a 360-degree video streaming service, for a 360-degree video or data based on the aspect ratio of the external electronic device and receive videos corresponding to the current view angle (e.g., view angle of the external electronic device or the electronic device 201) or videos or contents corresponding to some channels or sides from the server 201 without the necessity of establishing all streaming channels corresponding to the videos mapped to the respective sides of the polyhedron.

For example, if the 360-degree video stored in the server (e.g., server 106 in FIG. 1) is mapped to a virtual 3-dimensional projection space of a regular octahedron and if the aspect ratios of the electronic device and the external electronic device are 16:9 and 21:9 respectively, there is no need for the electronic device 201 to receive all streaming channels mapped to the regular octahedron and it needs only to receive videos corresponding to 6 sides or 6 channels for the view angle required for output of the external electronic device, the electronic device 201 may display videos of 3 sides or channels among the 6 sides or channels.

Figure 6A:
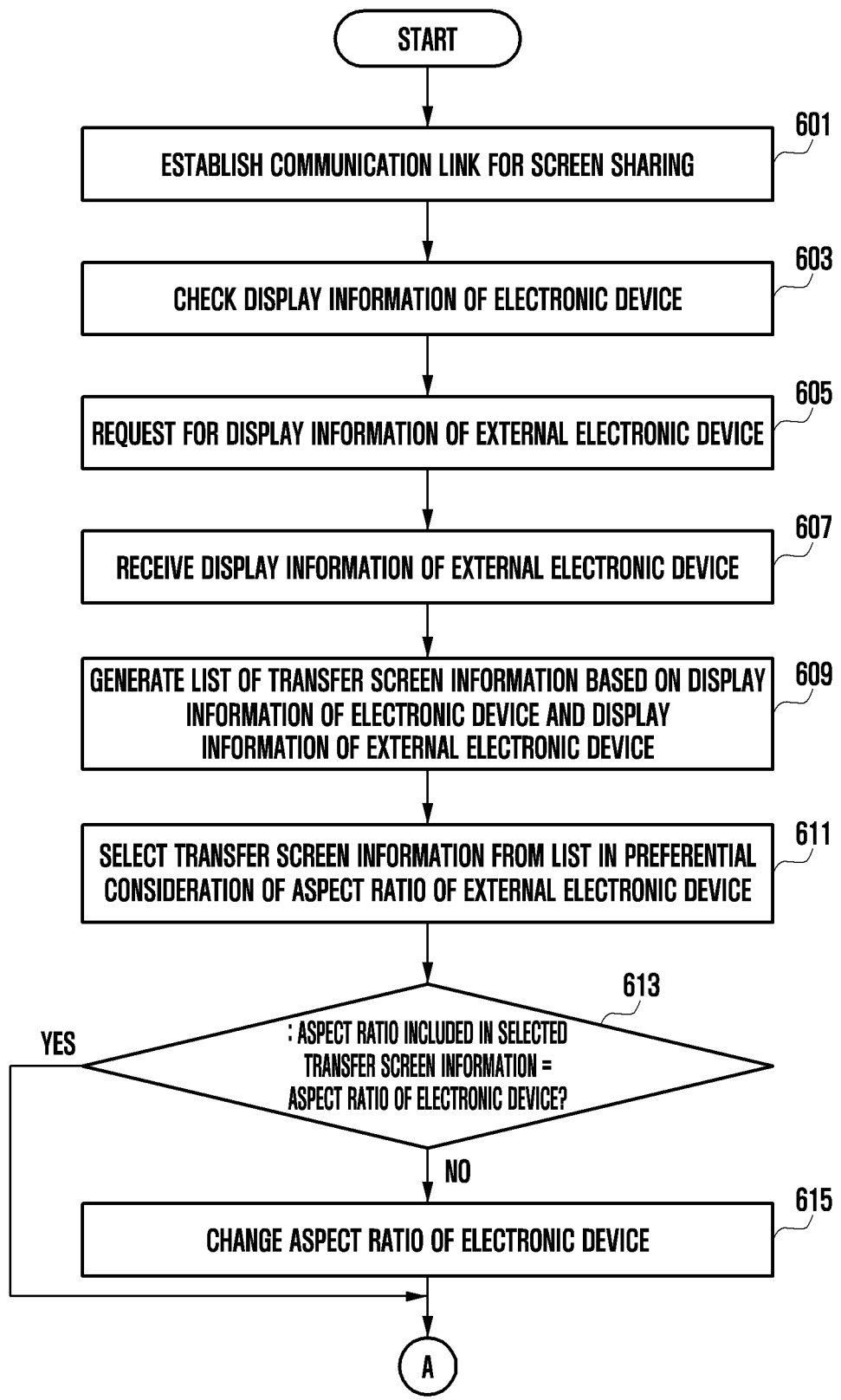
FIGS. 6A and 6B are a flowchart illustrating a screen sharing method of an electronic device according to various embodiments of the disclosure.
Figure 6B:
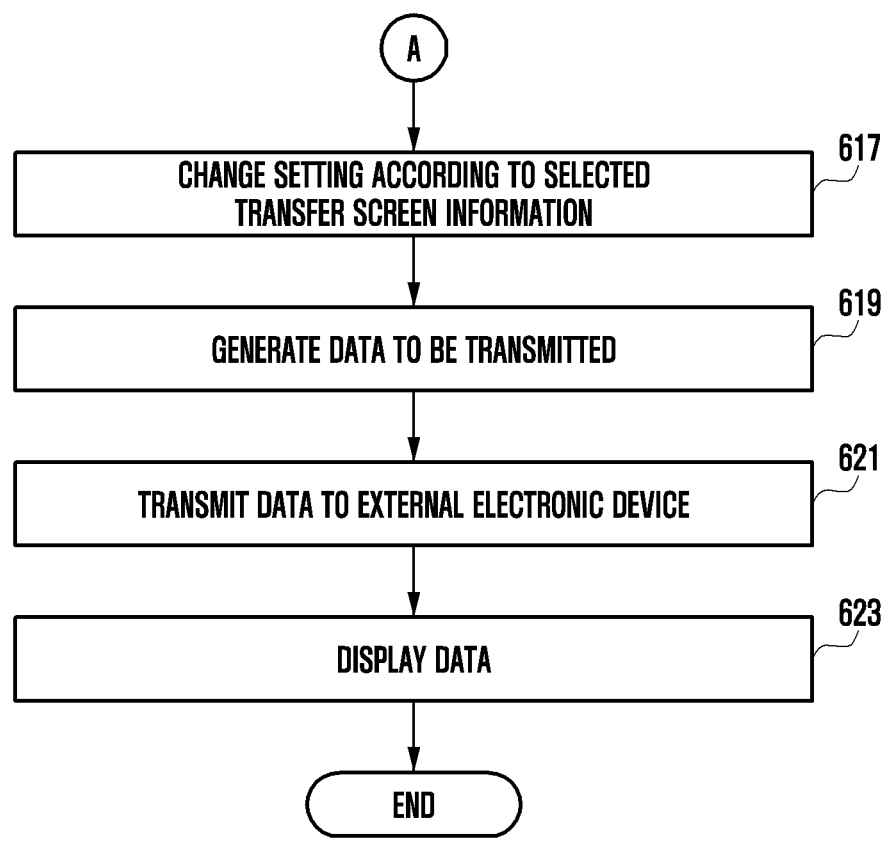

FIGS. 6A and 6B are a flowchart illustrating a screen sharing method of an electronic device according to various embodiments of the disclosure.

At step 601, the electronic device 201 may establish a communication link for sharing a screen with an external electronic device under the control of a processor 210.

The external electronic device may be identical with the electronic device (e.g., electronic device 101 in FIG. 1 and electronic device 201 in FIG. 2). The external electronic device may include a communication function (e.g., communication module 220 in FIG. 2) and a display (e.g., display 260 in FIG. 2). The external electronic device may be a home appliance (such as a TV, refrigerator, and washing machine), a virtual reality (VR) headset, or a vehicle including a display function and a communication function. The external electronic device may support wireline and/or wireless communication functions and include at least one of an HDMI (HDMI 272 in FIG. 2), a USB interface (e.g., USB 274 in FIG. 2), an optical interface (e.g., optical interface 276 in FIG. 2), a D-subminiature (D-SUB) interface (e.g., D-SUB 278 in FIG. 2), a digital visual interface (DVI), or a display port as its wireline communication interface. The external electronic device may also include at least one of a cellular module (e.g., cellular module 221 in FIG. 2), a Wi-Fi module (e.g., Wi-Fi module 223 in FIG. 2), or a Bluetooth module (e.g., BT module 225 in FIG. 2) as its wireless communication interface.

At step 601, the electronic device 601 may establish a communication link via the wireline communication interface and/or wireless communication interface for sharing a screen with the external electronic device under the control of the processor 210. For example, the electronic device 201 may establish a wireline communication link with the external device using the HDMI (e.g., HDMI 272 in FIG. 2), the USB (e.g., USB 274 in FIG. 2), or the display port. For example, the electronic device 201 may establish at least one of a Wi-Fi miracast link, a Google Cast™ link, or a mirror link with the external electronic device using at least one of the cellular module (e.g., cellular module 221 in FIG. 2), the Wi-Fi module (e.g., Wi-Fi module 223 in FIG. 2), or the Bluetooth module (e.g., BT module 225 in FIG. 2).

At step 601, the electronic device 201 may execute an application for sharing a screen in the middle of establishing a communication link with the external electronic device for sharing the screen via the wireline communication interface and/or wireless communication interface under the control of the processor 210. For example, the electronic device 201 may perform a screen sharing operation using the screen sharing application as to be described later. The screen sharing application may be the Wi-Fi miracast, Google Cast™, or mirror link.

At step 603, the electronic device 201 may check the display information of the electronic device 201 under the control of the processor 210.

At step 603, the electronic device may generate a list of resolutions and aspect ratios supported by the display 260 of the electronic device 201 under the control of the processor 210.

At step 603, the electronic device may check the display information supported by the electronic device 201 based on at least one of an application request, a data processing capability of the electronic device, a network bandwidth, a channel condition, and a data transfer rate under the control of the processor 210.

The data processing capability of the electronic device 201 may include information on supportable and unsupportable compression codecs. For example, the electronic device 201 may support MPEG-4 and H.264 codecs and may not support an H.265 (HEVC) codec; the electronic device 201 may store the information on the supportable and unsupportable codecs as data processing capability information.

The display information supported by the electronic device 201 may be information on the resolutions and aspect ratios supported by the display 260 of the electronic device, which are computed based on at least one of the application request, the data processing capability of the electronic device 201, the network bandwidth, the channel condition, and the data transfer rate.

At step 603, the electronic device 201 may check display information of the electronic device 201 and generate a list of identified display information under the control of the processor 210.

After establishing the communication link for sharing a screen with the external electronic device, the electronic device 201 may request, at step 605, to the external electronic device for display information of the external electronic device through a wireline interface and/or a wireless interface under the control of the processor 210.

After establishing the communication link for sharing a screen with the external electronic device, the electronic device 201 may receive, at step 607, the display information of the external electronic device from the external electronic device through a wireline interface and/or a wireless interface under the control of the processor 210.

The display information may include resolutions supported by the external electronic device and an aspect ratio (or horizontal/vertical ratio) of the external electronic device. For example, the display information may include extended display identification data (EDID) information.

The display information may include video format information (e.g., Wi-Fi display (WFD) video format of Wi-Fi miracast). The video format information may include at least one display-related parameter. For example, the WFD video format information may include wfd video format parameters or wfd 2 video format parameters.

In the case where the electronic device 201 and the external electronic device communicate through a wireline communication link, the display information may be exchanged through a display data channel (DDC).

In the case where the electronic device 201 and the external electronic device communicate through a wireless communication link, the video format information (e.g., WFD video format) may be exchanged via a specific protocol (e.g., real time streaming protocol).

In various embodiments, in the case where the electronic device 201 and the external electronic device communicate through a wireless communication link, they may exchange display information as supplementary information according to a wireless communication scheme (e.g., operation as specified in a communication standard).

At step 609, the electronic device 201 may generate a list of transfer screen information based on the display information of the electronic device 201 and the display information of the external electronic device under the control of the processor 201.

The transfer screen information may include resolutions and aspect ratios supported in common by the electronic device 201 and the external electronic device.

At step 611, the electronic device may select transfer screen information from the list generated in preferential consideration of the aspect ratio of the external electronic device under the control of the processor 210.

For example, the list generated at step 609 and the transfer screen information selected at step 6110 may be expressed as Tables 1 and 2.

TABLE 1

|  | Resolution | Aspect ratio |
|---|---|---|
| Electronic device | WQHD (2560 * 1440) | 16:9 |
| External electronic device | UHD (3840 * 2160) | 16:9 |
| Selected transfer screen information | FHD (1920 * 1080) | 16:9 |

TABLE 2

|  | Resolution | Aspect ratio |
|---|---|---|
| Electronic device | 2960 * 1440 | 18.5:9 |
| External electronic device | UHD (3840 * 2160) | 16:9 |
| Selected transfer screen information | FHD (1920 * 1080) | 16:9 |

As shown in Tables 1 and 2, it may be possible to determine an aspect ratio of the selected transfer screen information in preferential consideration of the aspect ratio of the external electronic device and select the best resolution available at the determined aspect ratio as the resolution for the selected transfer screen information.

At step 613, the electronic device 201 may determine whether the aspect ratio included in the selected screen information is identical with the aspect ratio of the electronic device under the control of the processor.

If it is determined at step 613 that the aspect ratio included in the selected screen information is identical with the aspect ratio of the electronic device 201, the procedure may go to step 617 under the control of the processor 210.

If it is determined at step 613 that the aspect ratio included in the selected screen information is different from the aspect ratio of the electronic device 201, the procedure may go to step 615 under the control of the procedure 210.

At step 615, the electronic device 210 may change the aspect ratio of the screen displayed on the display 260 of the electronic device according to the aspect ratio included in the selected screen information under the control of the processor 210.

With reference to Table 2 in which the aspect ratio included in the selected screen information differs from the aspect ratio of the electronic device 201, given the aspect ratio 18.5:9 of the electronic device and the aspect ratio 16:9 of the external electronic device, the aspect ratio included in the selected transfer screen information becomes 16:9 because the aspect ratio of the external electronic device is preferentially considered.

Accordingly, the aspect ratio (e.g., 18.5:9) of the electronic device 201 and the aspect ratio (e.g., 16:9) of the selected transfer screen information may differ from each other. In this case, the electronic device 201 may change its aspect ratio to become identical with the aspect ratio (e.g., 16:9) of the selected transfer screen information. Here, the resolution of the electronic device 201 may vary according to the aspect ratio (e.g., 16:9) of the selected transfer screen information.

The resolution of the electronic device 201 may be changed from the maximum supportable resolution (e.g., 2960*1440) to a modified resolution (e.g., 2560*1440) according to the aspect ratio (e.g., 16:9) of the selected transfer screen information. In the case of changing from the maximum supportable resolution (e.g., 2960*1440) to a modified resolution (e.g., 2560*1440) in accordance with the aspect ratio (e.g., 16:9) of the selected transfer screen information, data may be letterboxed or pillarboxed on the display 260 to maintain the aspect ratio.

With reference to Table 1 in which the aspect ratio included in the selected screen information is identical with the aspect ratio of the electronic device 201, given the aspect ratio 16:9 of the electronic device and the aspect ratio 16:9 of the external electronic device, the aspect ratio included in the selected transfer screen information becomes 16:9 because the aspect ratio of the external electronic device is preferentially considered. If the aspect ratio (e.g., 16:9) of the electronic device 201 and the aspect ratio (e.g., 16:9) of the selected transfer screen information are identical with each other, it is not necessary to change the resolution of the electronic device 201.

At step 617, the electronic device 201 may change a setting according to the selected transfer screen information under the control of the processor 210.

At step 617, the electronic device 201 may change settings of the display 260 and the processor 210 according to the selected transfer screen information under the control of the processor 210.

At step 619, the electronic device may generate data to be transmitted based on the selected transfer screen information under the control of the processor 210.

At step 619, the electronic device 201 may generate the data to be transmitted with the data of the screen displayed on the display 260 or streaming data based on the selected transfer screen information under the control of the processor 210.

At step 619, the electronic device 201 may encode data of the screen displayed on the display unit 260 or streaming data received from the server to generate data to be transmitted based on the selected transfer screen information under the control of the processor 210.

At step 621, the electronic device 201 may transmit the generated data to the external electronic device via the wireline communication interface and/or the wireless communication interface under the control of the processor 210.

At step 621, the electronic device may display the data on the display 260 under the control of the processor. The data may be information on the content or screen that is currently displayed.

Figure 7A:
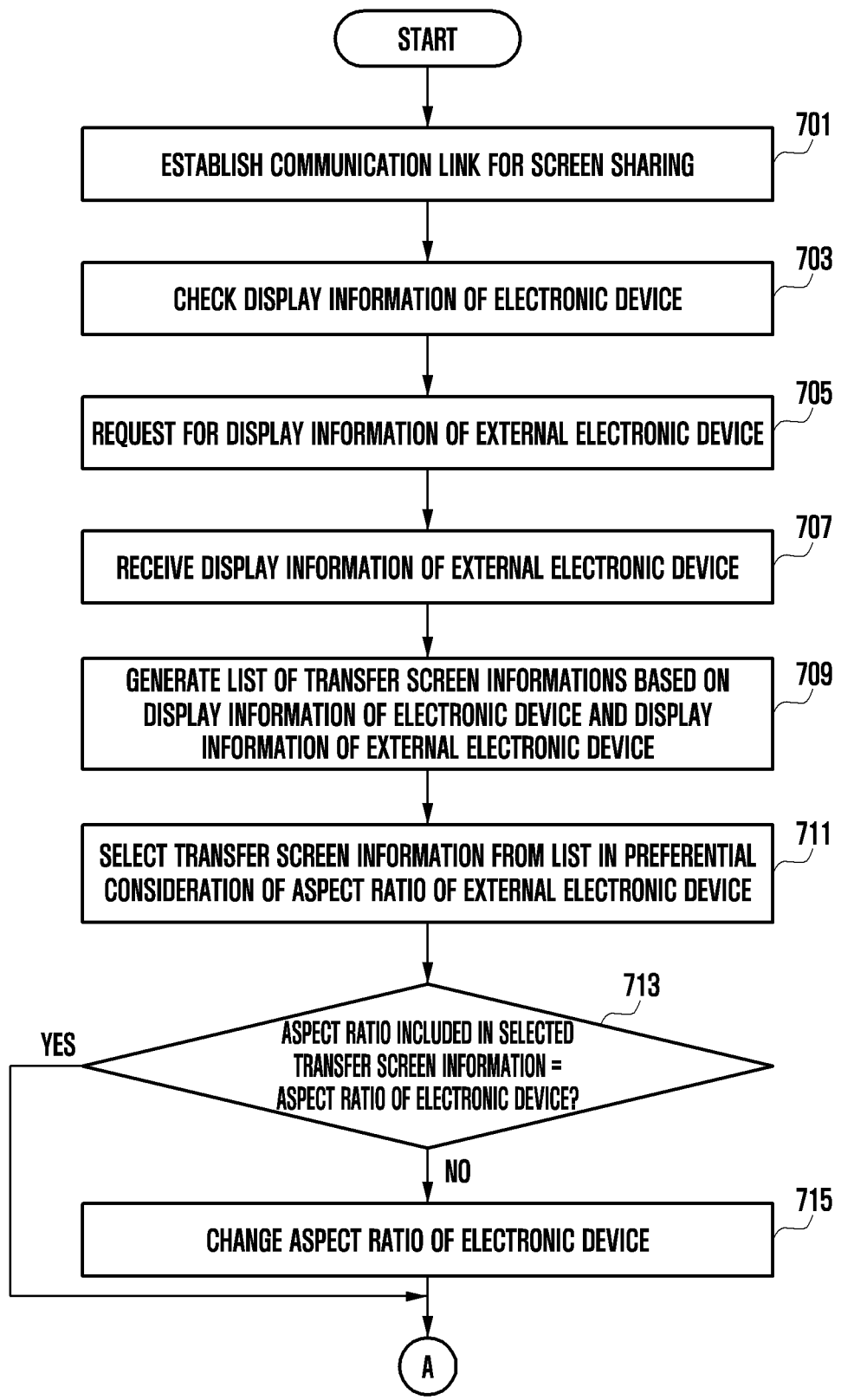
FIGS. 7A and 7B are a flowchart illustrating a screen sharing method of an electronic device according to various embodiments of the disclosure.
Figure 7B:
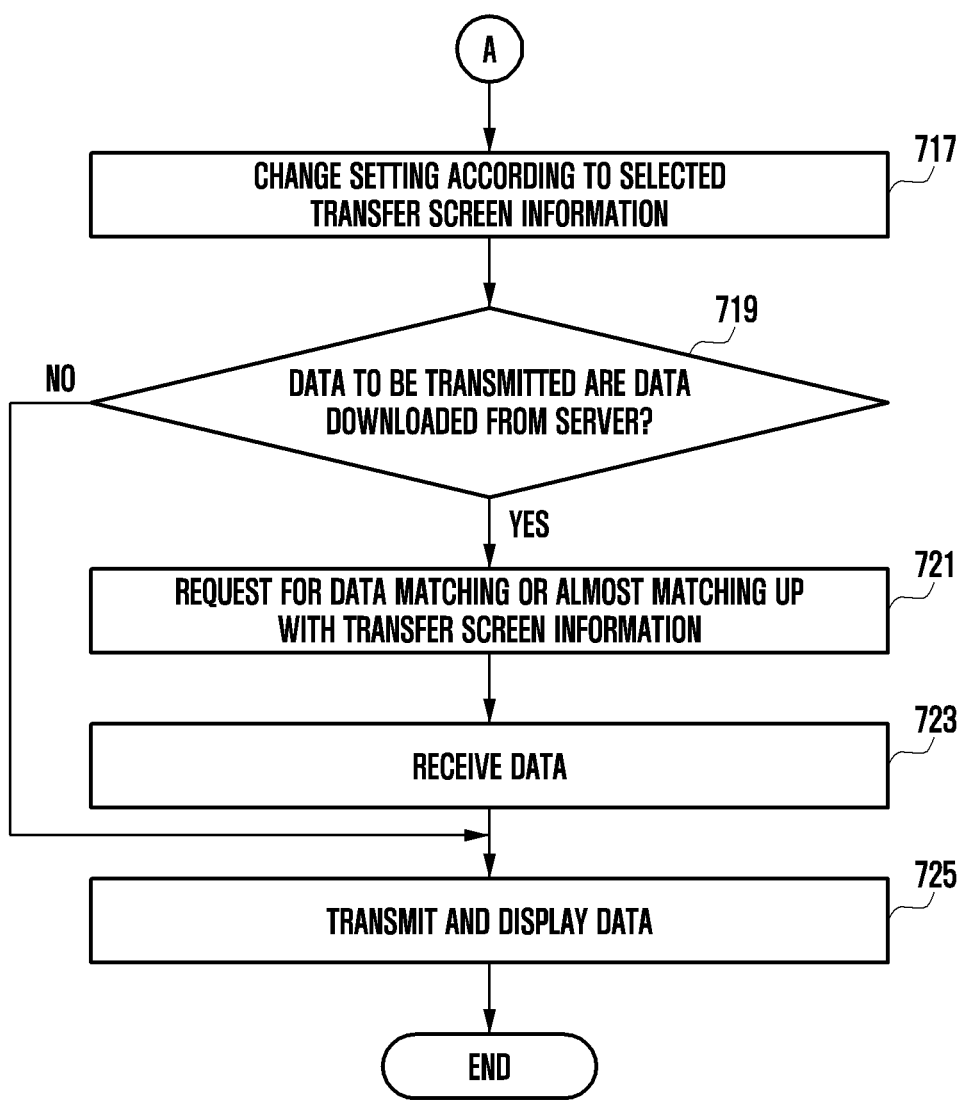

FIGS. 7A and 7B are a flowchart illustrating a screen sharing method of an electronic device according to various embodiments of the disclosure.

At step 701, the electronic device 201 may establish a communication link for sharing a screen with an external electronic device under the control of a processor 210.

The external electronic device may be identical with the electronic device (e.g., electronic device 101 in FIG. 1 and electronic device 201 in FIG. 2). The external electronic device may include a communication function (e.g., communication module 220 in FIG. 2) and a display (e.g., display 260 in FIG. 2). The external electronic device may be a home appliance (such as a TV, refrigerator, and washing machine), a virtual reality (VR) headset, or a vehicle including a display function and a communication function. The external electronic device may support wireline and/or wireless communication functions and include at least one of an HDMI (HDMI 272 in FIG. 2), a USB interface (e.g., USB 274 in FIG. 2), an optical interface (e.g., optical interface 276 in FIG. 2), a D-subminiature (D-SUB) interface (e.g., D-SUB 278 in FIG. 2), a digital visual interface (DVI), or a display port as its wireline communication interface. The external electronic device may also include at least one of a cellular module (e.g., cellular module 221 in FIG. 2), a Wi-Fi module (e.g., Wi-Fi module 223 in FIG. 2), or a Bluetooth module (e.g., BT module 225 in FIG. 2) as its wireless communication interface.

At step 701, the electronic device 601 may establish a communication link via the wireline communication interface and/or wireless communication interface for sharing a screen with the external electronic device under the control of the processor 210. For example, the electronic device 201 may establish a wireline communication link with the external device using the HDMI (e.g., HDMI 272 in FIG. 2), the USB (e.g., USB 274 in FIG. 2), or the display port. For example, the electronic device 201 may establish at least one of a Wi-Fi miracast link, a Google Cast™ link, or a mirror link with the external electronic device using at least one of the cellular module (e.g., cellular module 221 in FIG. 2), the Wi-Fi module (e.g., Wi-Fi module 223 in FIG. 2), or the Bluetooth module (e.g., BT module 225 in FIG. 2).

At step 701, the electronic device 201 may execute an application for sharing a screen in the middle of establishing a communication link with the external electronic device for sharing the screen via the wireline communication interface and/or wireless communication interface under the control of the processor 210. For example, the electronic device 201 may perform a screen sharing operation using the screen sharing application as to be described later. The screen sharing application may be the Wi-Fi miracast, Google Cast™, or mirror link.

At step 703, the electronic device 201 may check the display information of the electronic device 201 under the control of the processor 210.

At step 703, the electronic device may generate a list of resolutions and aspect ratios supported by the display 260 of the electronic device 201 under the control of the processor 210.

At step 703, the electronic device may check the display information supported by the electronic device 201 based on at least one of an application request, a data processing capability of the electronic device, a network bandwidth, a channel condition, and a data transfer rate under the control of the processor 210. The display information supported by the electronic device 201 may be information on the resolutions and aspect ratios supported by the display 260 of the electronic device, which are computed based on at least one of the application request, the data processing capability of the electronic device 201, the network bandwidth, the channel condition, and the data transfer rate. The data processing capability of the electronic device 201 may include information on supportable and unsupportable compression codecs. For example, the electronic device 201 may support MPEG-4 and H.264 codecs and may not support an H.265 (HEVC) codec; the electronic device 201 may store the information on the supportable and unsupportable codecs as data processing capability information.

At step 703, the electronic device 201 may check display information of the electronic device 201 and generate a list of identified display information under the control of the processor 210.

After establishing the communication link for sharing a screen with the external electronic device, the electronic device 201 may request, at step 705, to the external electronic device for display information of the external electronic device through a wireline interface and/or a wireless interface under the control of the processor 210.

After establishing the communication link for sharing a screen with the external electronic device, the electronic device 201 may receive, at step 707, the display information of the external electronic device from the external electronic device through a wireline interface and/or a wireless interface under the control of the processor 210.

The display information may include resolutions supported by the external electronic device and an aspect ratio (or horizontal/vertical ratio) of the external electronic device. For example, the display information may include extended display identification data (EDID) information.

The display information may include video format information (e.g., Wi-Fi display (WFD) video format of Wi-Fi miracast). The video format information may include at least one display-related parameter. For example, the WFD video format information may include wfd video format parameters or wfd 2 video format parameters.

In the case where the electronic device 201 and the external electronic device communicate through a wireline communication link, the display information may be exchanged through a display data channel (DDC); in the case where the electronic device 201 and the external electronic device communicate through a wireless communication link, the video format information (e.g., WFD video format) may be exchanged via a specific protocol (e.g., real time streaming protocol).

In the case where the electronic device 201 and the external electronic device communicate through a wireless communication link, the video format information (e.g., WFD video format) may be exchanged via a specific protocol (e.g., real time streaming protocol).

In various embodiments, in the case where the electronic device 201 and the external electronic device communicate through a wireless communication link, they may exchange display information as supplementary information according to a wireless communication scheme (e.g., operation as specified in a communication standard).

At step 709, the electronic device 201 may generate a list of transfer screen information based on the display information of the electronic device 201 and the display information of the external electronic device under the control of the processor 201.

The transfer screen information may include resolutions and aspect ratios supported in common by the electronic device 201 and the external electronic device.

At step 711, the electronic device may select transfer screen information from the list generated in preferential consideration of the aspect ratio of the external electronic device under the control of the processor 210.

At step 713, the electronic device 201 may determine whether the aspect ratio included in the selected screen information is identical with the aspect ratio of the electronic device under the control of the processor.

If it is determined at step 713 that the aspect ratio included in the selected screen information is identical with the aspect ratio of the electronic device 201, the procedure may go to step 617 under the control of the processor 210.

If it is determined at step 713 that the aspect ratio included in the selected screen information is different from the aspect ratio of the electronic device 201, the procedure may go to step 615 under the control of the processor 210.

At step 715, the electronic device 210 may change the aspect ratio of the screen displayed on the display 260 of the electronic device according to the aspect ratio included in the selected screen information under the control of the processor 210.

At step 717, the electronic device 201 may change a setting according to the selected transfer screen information under the control of the processor 210.

At step 717, the electronic device 201 may change settings of the display 260 and the processor 210 according to the selected transfer screen information under the control of the processor 210.

At step 719, the electronic device 201 may determine whether the data to be transmitted are data downloaded from the server (e.g., server 106 in FIG. 1) under the control of the processor 210.

If it is determined at step 719 that the data to be transmitted are not data downloaded from the server (e.g., server 106 in FIG. 1), the procedure may go to step 725 under the control of the processor 210.

If it is determined at step 719 that the data to be transmitted are data downloaded from the server (e.g., server 106 in FIG. 1), the procedure may go to step 721 under the control of the processor 210.

If it is determined that the data to be transmitted are data downloaded from the server (e.g., server 106 in FIG. 1), the electronic device 201 may request, at step 721, to the server for data matching or almost matching up with the transfer screen information through the wireline communication interface and/or wireless communication interface under the control of the processor. If it is determined that the data to be transmitted are data downloaded from the server (e.g., server 106 in FIG. 1), the electronic device 201 may request, at step 721, to the server for data related to the transfer screen information (e.g., data matching or almost matching resolution ratio) through the wireline communication interface and/or wireless communication interface under the control of the processor.

TABLE 3

| | Resolution | Aspect ratio |
| --- | --- | --- |
| Electronic device | WQHD (2560 × 1440) | 16:9 |
| External electronic device | 2960 × 1440 | 18.5:9 |
| Selected transfer screen information | 2220 × 1080 | 18.5:9 |

TABLE 3-continued

| | Resolution | Aspect ratio |
| --- | --- | --- |
| Content resolution (provided by server) | 1440 × 1080 | 4:3 |
| | FHD (1920 × 1080) | 16:9 |
| | 2220 × 1080 | 18.5:9 |
| | 3840 × 1920 (360°°Video) | 2:1 (360°°Video) |
| | 3840 × 3840 (360°°Stereo Scope Video) | 1:1 (360°°Video) |

In reference to Table 3, a resolution of 2220×1080 and an aspect ratio of 18.5:9 may be data matching or almost matching between the resolutions (e.g., at least one of 1440×1080, 1920×1080 (FHD), or 2220×1080) and aspect ratios (e.g., at least one of 4:3, 16:9, or 18.5:9) provided by the server and the resolutions and aspect ratios included in the transfer screen information. The electronic device 201 may request to the server for the data identical or almost identical with the transfer screen information.

In the case where the content or data requested by electronic device 201 to the server is a 360-degree video, there is no need to display the original content on the display of the electronic device 201 or the external electronic device by the nature of the 360-degree video. Because the 360-degree video is characterized such that a video corresponding to a view angle or location on the display of the electronic device 201 or the external electronic device is displayed, part of the original content may be displayed on the display of the electronic device 201 or the external electronic device by the nature of the 360-degree video.

In the case where the content or data requested by the electronic device 201 to the server is a 360-degree video, the electronic device 201 may request to the server for data matching or almost matching up with the transfer screen information, and the server may transmit the data to the electronic device 201 in preferential consideration of the resolution rather than the aspect ratio in the screen information in response to the request.

In various embodiments, the server (e.g., server 106 in FIG. 1) may split the content or data by a predetermined unit of time for various resolutions and/or aspect ratios and store the produced result in a predetermined file format. In the case of splitting the content or data by a predetermined unit of time for various resolutions and/or aspect ratios and storing the produced result, the server (e.g., server 106 in FIG. 1) may store a list of paths (e.g., URLs) corresponding to split files. For example, the server (e.g., server 106 in FIG. 1) may split a video with a length of 1 hour into 1 second lengths and store 1-second videos per resolution and/or aspect ratio. For example, the 1-second videos may have a resolution of 1920×1080 (FHD) or 1440×1080 and be stored per resolution as split into 1 second lengths.

For example, if being requested for data matching or almost matching up with the transfer screen information, the server (e.g., server 106 in FIG. 1) transmits a list of paths (e.g., URLs) corresponding to the split files to the electronic device.

If the list of the paths (e.g., URLs) corresponding to the split files is received from the server (e.g., server 106 in FIG. 1), a data requesting unit (e.g., Dash Controller) of the electronic device 201 may determine files to download. The data requesting unit (e.g., Dash Controller) of the electronic device 201 may be included in the processor 210 of the electronic device 201. The data requesting unit (e.g., Dash Controller) of the electronic device 201 may control the electronic device 201 to download pertinent files in consideration of the environment (e.g., network speed and data processing capability) of the electronic device 201.

According to an embodiment, the electronic device 201 may transmit a DASH descriptor having an option field set to an aspect ratio (screen_ratio, 2.056, 1"/) such as <SupplementalProperty schemeIdUri="urn:mpeg:dash:VR:2016" screen_ratio, 2.056, 1"/> to the server in order to receive data matching or almost matching up with the transfer screen information from the server, and the server may refer to the transfer screen information received from the electronic device so as to transmit the data optimized for the aspect ratio indicated in the transfer screen information to the external electronic device.

According to an embodiment, in order for the electronic device 201 to receive data matching or almost matching up with the transfer screen information, the data requesting unit (e.g., Dash Controller) of the electronic device 201 may request to the server (e.g., server 106 in FIG. 1) for video, contents, or data in consideration of the aspect ratio of the external electronic device based on the transfer screen information.

At step 723, the electronic device may receive the data matching or almost matching up with the transfer screen information from the server via the wireline communication interface and/or wireless communication interface under the control of the processor 210.

In various embodiments, the electronic device 201 may receive the data related to the transfer screen information (e.g., data matching or almost matching up with the resolution ratio) via the wireline communication interface and/or wireless communication interface under the control of the processor 210.

At step 725, the electronic device 201 may generate data to be transmitted based on the selected transfer screen information, transmit the generated data to the external electronic device through the wireline communication interface and/or wireless communication interface, and display the data on the display 260 under the control of the processor 210.

In the case of transmitting, at step 725, the data related to the screen displayed on the display 260, based on the information of the screen to be transmitted, to the external electronic device through the wireline communication interface and/or wireless communication interface, the electronic device 201 may selectively encode or not encode the data related to the screen displayed on the display 260 before transmission.

For example, at steps 723 and 725, the electronic device 201 may receive a content with a large view angle (e.g., polyhedron-mapped 360-degree video streaming service) from the server (e.g., server 106 in FIG. 1) in a streaming fashion and transmit the content to the external electronic device.

In the case where the server (e.g., server 106 in FIG. 1) transmits data to the electronic device 201 in an adaptative quality streaming scheme such as MPEG-DASH and HLS, the electronic device 201 may request for view angle information (e.g., degree of view angle) of the data to be received from the server (e.g., server 106 in FIG. 1) based on the aspect ratio of the external electronic device. In the case of requesting for view angle information (e.g., degree of view angle) of the data to be received from the server (e.g., server 106 in FIG. 1) based on the aspect ratio of the external electronic device, the electronic device 201 may use a data requesting unit (e.g., DASH controller) included in the electronic device 201. The data requesting unit (e.g., DASH controller) may be at least part of the processor 210 or a component of another electronic device 210 that is not associated with the processor 210.

The polyhedron-mapped 360-degree video streaming service may provide contents or data supporting a 360-degree video by way of example.

The server (e.g., server 106 in FIG. 1) may store the 360-degree video so as to be mapped to a virtual 3-dimensional projection space (e.g., polyhedron), and the server (e.g., server 106 in FIG. 1) may establish a channel per 3-dimensional projection space to provide a video streaming service. For example, the virtual 3-dimensional projection space may be designed in the forms of various polyhedra such as a regular tetrahedron, a regular octahedron, and a regular icosahedron; the server may establish streaming channels for video data mapped to respective sides of the polyhedron and transmit the video data through the streaming channels.

At steps 723 and 725, the electronic device 201 may request, to the server (e.g., server 106 in FIG. 1) providing a 360-degree video streaming service, for a 360-degree video or data based on the aspect ratio of the external electronic device and receive videos corresponding to the current view angle (e.g., view angle of the external electronic device or the electronic device 201) or videos or contents corresponding to some channels or sides from the server 201 without the necessity of establishing all streaming channels corresponding to the videos mapped to the respective sides of the polyhedron.

For example, if the 360-degree video stored in the server (e.g., server 106 in FIG. 1) is mapped to a virtual 3-dimensional projection space of a regular octahedron and if the aspect ratios of the electronic device and the external electronic device are 16:9 and 21:9 respectively, there is no need for the electronic device 201 to receive all streaming channels mapped to the regular octahedron and it only needs to receive videos corresponding to 6 sides or 6 channels for the view angle required for output of the external electronic device, the electronic device 201 may display videos of 3 sides or channels among the 6 sides or channels.

Figure 8:
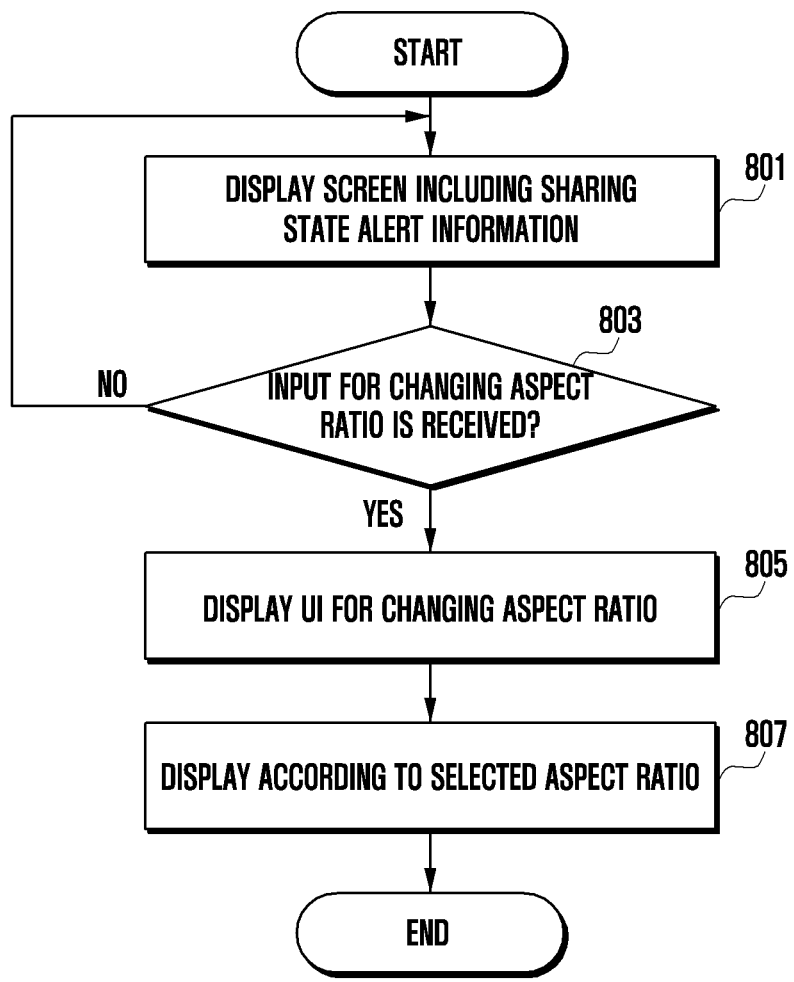
FIG. 8 is a flowchart illustrating an aspect ratio changing procedure of an electronic device according to various embodiments of the disclosure.

FIG. 8 is a flowchart illustrating an aspect ratio changing procedure of an electronic device 201 according to various embodiments of the disclosure.

At step 801, the electronic device 201 may display a screen including sharing state alert information on the display 260 under the control of the processor 210. At step 801, the screen displayed on the display may be in a state of the screen after completing the screen sharing with the external electronic device as described with reference to FIGS. 4 to 7B.

At step 803, the electronic device 201 may determine whether an input for changing an aspect ratio is received through a touch panel under the control of the processor 210.

If it is determined at step 803 that no input for changing the aspect ratio is received through the touch panel, the procedure may go back to step 801.

If it is determined at step 803 that an input for changing the aspect ratio is received through the touch panel, the procedure may go to stop 805.

If an input for changing the aspect ratio is received through the touch panel, the electronic device may display, at step 805, a user interface (UI) for changing the aspect ratio on the display 260 under the control of the processor 210. The UI may include information on at least one of aspect ratio or resolution.

At step 807, the electronic device may display a screen with an aspect ratio selected through the UI on the display 260 under the control of the processor 210.

Figure 9:
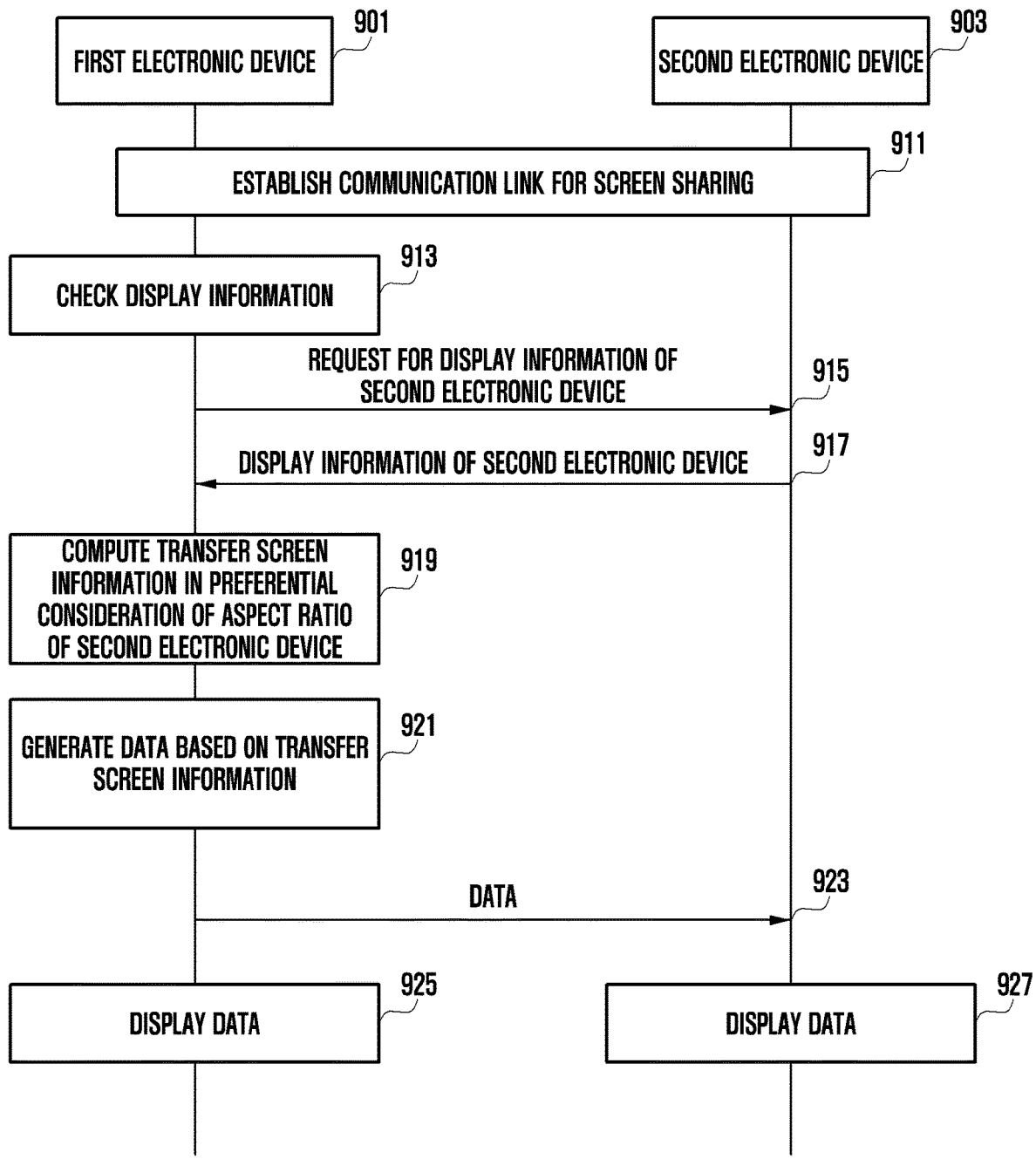
FIG. 9 is a signal flow diagram illustrating a screen sharing method between a first electronic device and a second electronic device according to various embodiments of the disclosure.

FIG. 9 is a signal flow diagram illustrating a screen sharing method between a first electronic device 901 and a second electronic device 903 according to various embodiments of the disclosure.

At step 911, the first electronic device 901 may establish a communication link for sharing a screen with an external electronic device. The first electronic device may be identical with the electronic device 201 in FIGS. 4 to 7B. The second electronic device 903 may be identical with the external device mentioned in FIGS. 4 to 7B.

At step 913, the first electronic device 901 may check the display information of the first electronic device 901.

At step 913, the first electronic device may generate a list of information on resolutions and aspect ratios supported by a display of the first electronic device.

At step 913, the first electronic device may check for display information of the first electronic device 901 to generate a list of the display information.

After establishing the communication link for sharing a screen with the second electronic device 903, the first electronic device may request, at step 915, for display information of the second electronic device 903 through a wireline interface and/or a wireless interface.

At step 917, the second electronic device 903 may transmit the display information of the second electronic device 903 to the first electronic device 901 through the wireline interface and/or wireless interface. The display information may include information on resolutions and aspect ratios (or horizontal-vertical ratios) supported by the second electronic device 903.

Upon receipt of the display information of the second electronic device 903, the first electronic device may compute, at step 919, transfer screen information in preferential consideration of the aspect ratio of the second electronic device 903 based on the display information of the second electronic device 903.

At step 921, the first electronic device 901 may generate data to be transmitted to the second electronic device 903 based on the computed transfer screen information.

At step 923, the first electronic device 901 may transmit the generated data to the second electronic device 903 through the wireline interface and/or wireless interface.

At step 923, the first electronic device 901 may display a screen generated based on the transfer screen information on the display.

At step 925, the second electronic device 903 may display received data on its display.

FIGS. 10A to 10D are diagrams illustrating exemplary screen displays of an electronic device 1010 and an external electronic device 1020 for explaining a method for sharing a screen between the electronic device 101 and the external electronic device 1020 according to various embodiments of the disclosure.

The electronic device 1010 may be identical with the electronic device 201 in FIGS. 4 to 9. The external electronic device 1020 may be identical with the external electronic device in FIGS. 4 to 9.

Figure 10A:
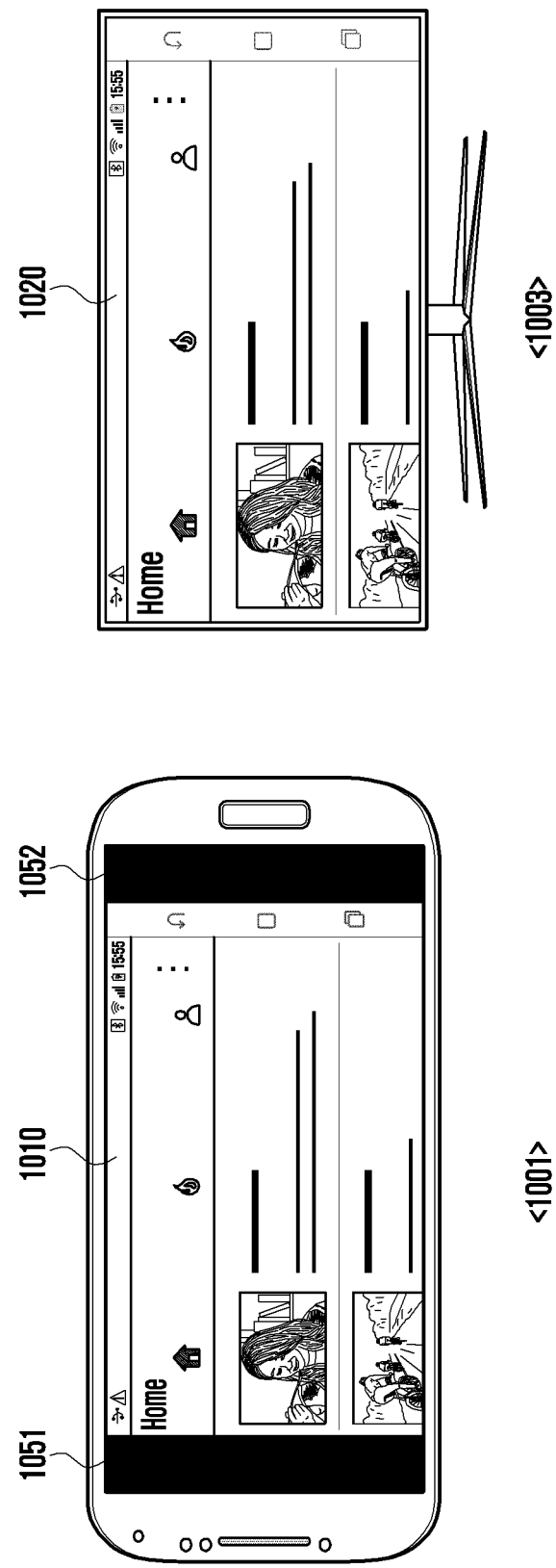
FIGS. 10A, 10B, 10C, and 10D are diagrams illustrating exemplary screen displays of an electronic device and an external electronic device for explaining a method for sharing a screen between the electronic device and the external electronic device according to various embodiments of the disclosure.

In FIG. 10A, reference number 1001 denotes the electronic device 1010 displaying a screen after screen sharing has been completed between the electronic device 1010 and the external electronic device 1020 as described with reference to FIGS. 4 to 9.

Reference number 1003 denotes the external electronic device 1020 displaying a screen after screen sharing has been completed between the electronic device 1010 and the external electronic device 1020 as described with reference to FIGS. 4 to 9. Because the screen sharing is performed in preferential consideration of the second electronic device 1020 when the aspect ratio of the external electronic device 1020 differs from the aspect ratio of the electronic device 1010, the shared screen may be letterboxed or pillarboxed on the electronic device 1010, which is not the case for the external electronic device 1020.

Assuming that an aspect ratio of the electronic device 1010 is 18.5:9 and an aspect ratio of the external electronic device 1020 is 16:9, the electronic device 1010 may adjust the output aspect ratio of data (e.g., application execution screen), because the screen sharing is performed in preferential consideration of the external electronic device 1020, to become 16:9 and identical with the aspect ratio of the external electronic device 1020 such that black bars 1051 and 1052 are placed in both sides of the screen of the display (e.g., display 260), which is not the case for the external electronic device 1020.

Figure 10B:
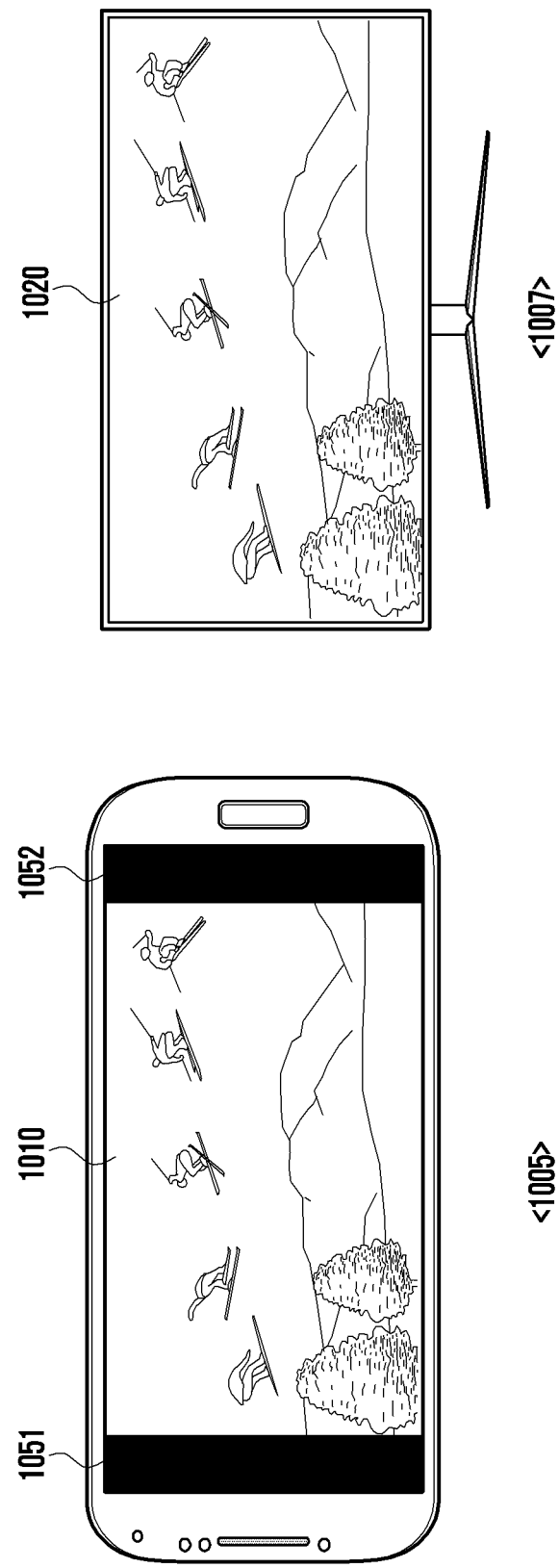

In FIG. 10B, reference number 1005 denotes the electronic device 1010 displaying a screen after screen sharing has been completed between the electronic device 1010 and the external electronic device 1020 as described with reference to FIGS. 4 to 9.

Reference number 1007 denotes the external electronic device 1020 displaying a screen after screen sharing has been completed between the electronic device 1010 and the external electronic device 1020 as described with reference to FIGS. 4 to 9. Because the screen sharing is performed in preferential consideration of the second electronic device 1020 when the aspect ratio of the external electronic device 1020 differs from the aspect ratio of the electronic device 1010, the shared screen may be letterboxed or pillarboxed on the electronic device 1010, which is not the case for the external electronic device 1020.

Assuming that an aspect ratio of the electronic device 1010 is 18.5:9 and an aspect ratio of the external electronic device 1020 is 16:9, the electronic device 1010 may adjust the output aspect ratio of a content (e.g., video), because the screen sharing is performed in preferential consideration of the external electronic device 1020, to become 16:9 and identical with the aspect ratio of the external electronic device 1020 such that black bars 1051 and 1052 are placed in both sides of the screen of the display (e.g., display 260), which is not the case for the external electronic device 1020.

Figure 10C:
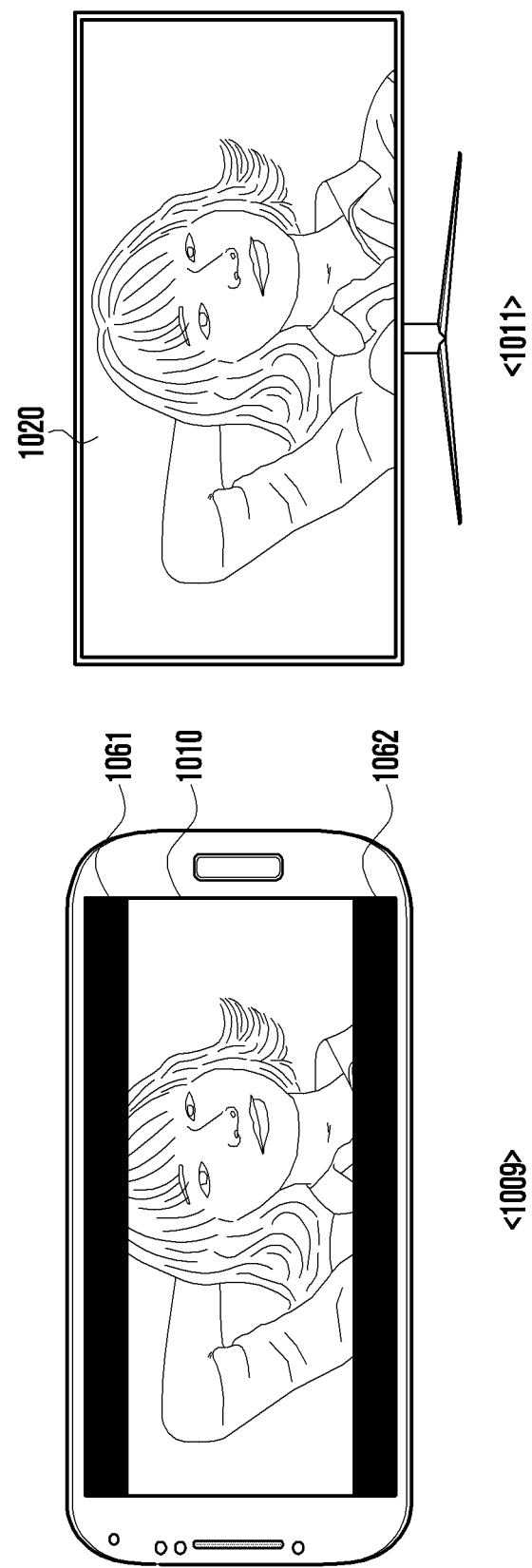

In FIG. 10C, reference number 1009 denotes the electronic device 1010 displaying a screen after screen sharing has been completed between the electronic device 1010 and the external electronic device 1020 as described with reference to FIGS. 4 to 9.

Reference number 1011 denotes the external electronic device 1020 displaying a screen after screen sharing has been completed between the electronic device 1010 and the external electronic device 1020 as described with reference to FIGS. 4 to 9. Because the screen sharing is performed in preferential consideration of the second electronic device 1020 when the aspect ratio of the external electronic device 1020 differs from the aspect ratio of the electronic device 1010, the shared screen may be letterboxed or pillarboxed on the electronic device 1010, which is not the case for the external electronic device 1020.

Assuming that an aspect ratio of the electronic device 1010 is 16:9 and an aspect ratio of the external electronic device 1020 is 18.5:9, the electronic device 1010 may adjust the output aspect ratio of a content (e.g., video), because the screen sharing is performed in preferential consideration of the external electronic device 1020, to become 18.5:9 and identical with the aspect ratio of the external electronic device 1020 such that black bars 1061 and 1062 are placed in the top and bottom sides of the screen of the display (e.g., display 260), which is not the case for the external electronic device 1020.

In the case of downloading the content from the server, the electronic device 1010 may download, from the server (e.g., server 106 in FIG. 1), the content or data matched up with the aspect ratio and resolution of the external electronic device 1020 such that the letterboxed content (e.g., video) is displayed with the output aspect ratio of 18.5:1 along with black bars 1061 and 1062 placed in the top and bottom sides of the screen of the display (e.g., display 260).

Figure 10D:
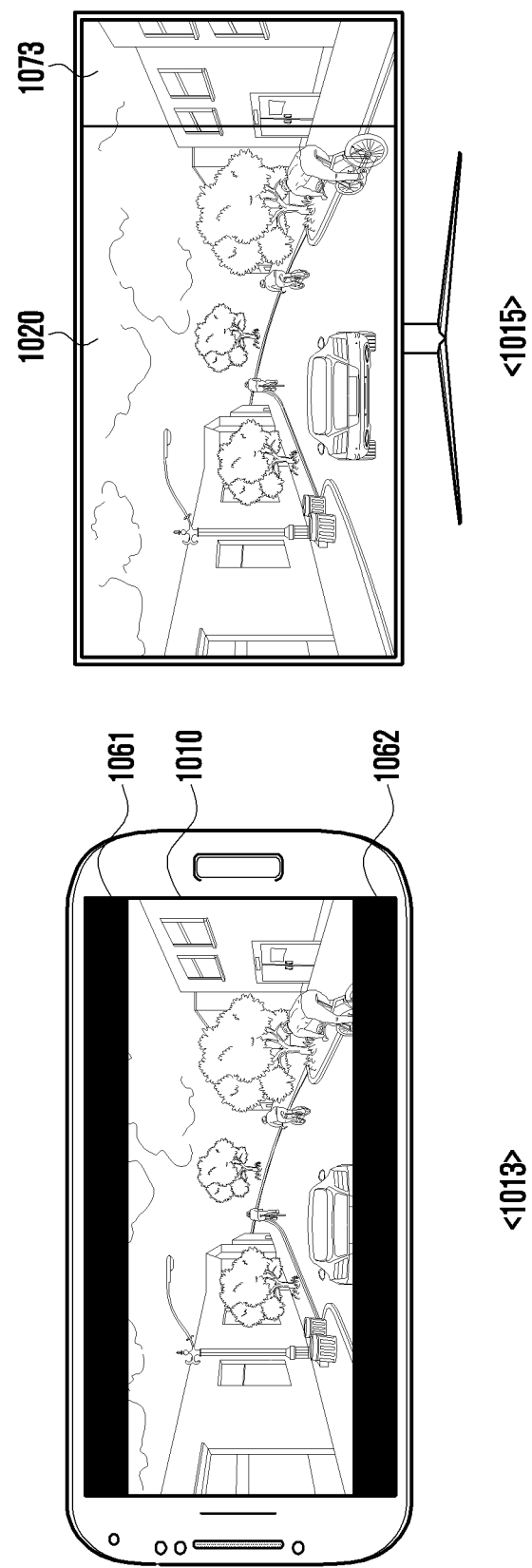

In FIG. 10D, reference number 1013 denotes the electronic device 1010 displaying a screen after screen sharing has been completed between the electronic device 1010 and the external electronic device 1020 as described with reference to FIGS. 4 to 9.

Reference number 1015 denotes the external electronic device 1020 displaying a screen after screen sharing has been completed between the electronic device 1010 and the external electronic device 1020 as described with reference to FIGS. 4 to 9. Because the screen sharing is performed in preferential consideration of the second electronic device 1020 when the aspect ratio of the external electronic device 1020 differs from the aspect ratio of the electronic device 1010, the shared screen may be letterboxed or pillarboxed on the electronic device 1010, which is not the case for the external electronic device 1020.

Assuming that an aspect ratio of the electronic device 1010 is 16:9 and an aspect ratio of the external electronic device 1020 is 18.5:9, the electronic device 1010 may adjust the output aspect ratio of a content (e.g., video), because the screen sharing is performed in preferential consideration of the external electronic device 1020, to become 18.5:9 and identical with the aspect ratio of the external electronic device 1020 such that black bars 1061 and 1062 are placed in top and bottom sides of the screen of the display (e.g., display 260), which is not the case for the external electronic device 1020.

In the case of downloading, from the server, the content such as a 360-degree video of which part is displayed on the electronic device 1010 or the external electronic device 1020, the electronic device 1010 may download, from the server (e.g., server 106 in FIG. 1), the content or data matched up with the aspect ratio and resolution of the external electronic device 1020 such that the external electronic device 1020 may display an extra part 1073 of the content that is not displayed on the electronic device 1010.

Figure 11:
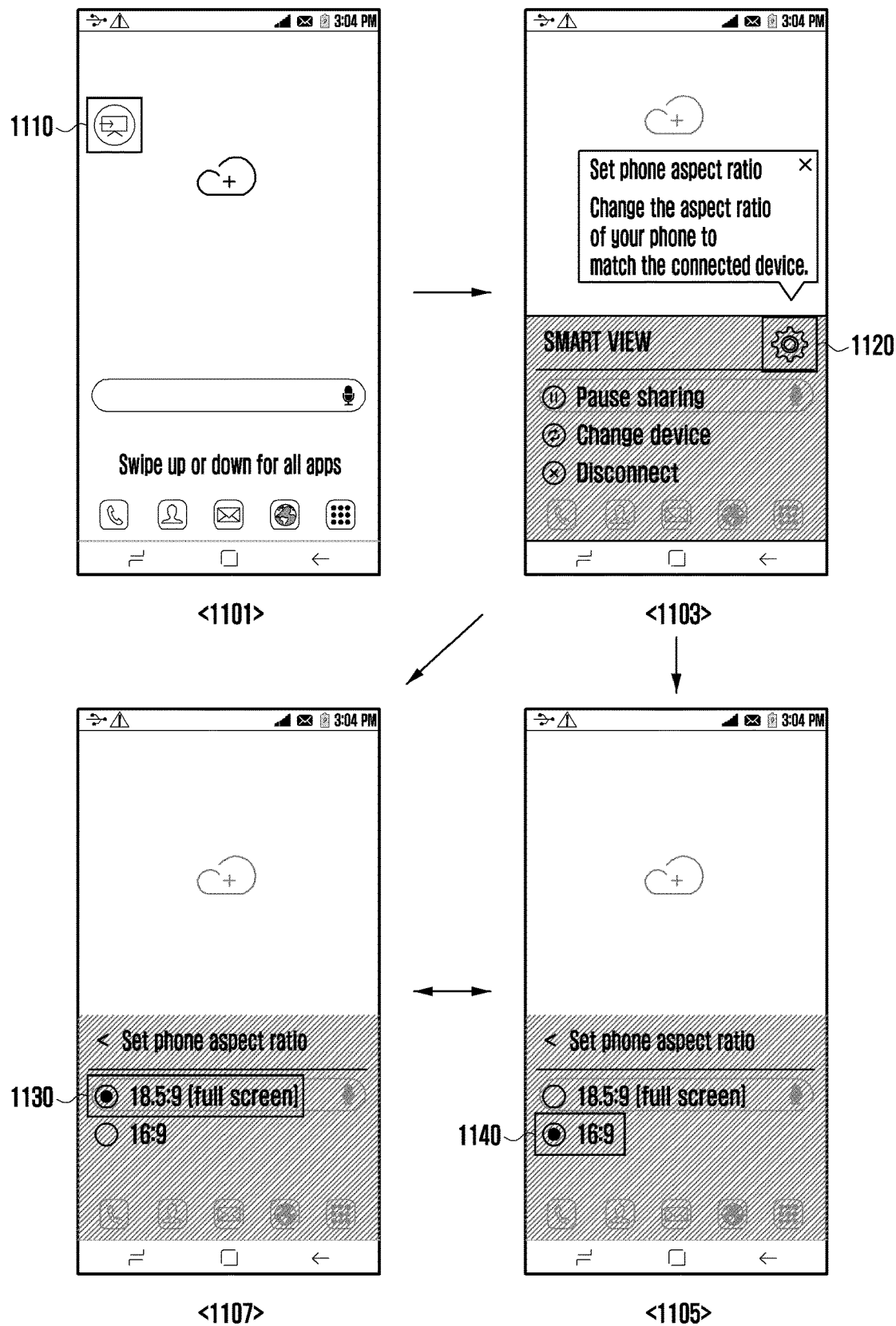
FIG. 11 is a diagram illustrating exemplary screen displays for explaining an aspect ratio changing method of the electronic device 201 of FIG. 8 according to various embodiments of the disclosure.

FIG. 11 is a diagram illustrating exemplary screen displays for explaining an aspect ratio changing method of the electronic device 201 of FIG. 8 according to various embodiments of the disclosure.

The electronic device 201 may display a screen including sharing state alert information on a display as denoted by reference number 1101.

The electronic device 201 may determine whether an input for changing an aspect ratio in received through a touch panel as denoted by reference number 1103. If an input for changing the aspect ratio is received through the touch panel, the electronic device 201 may display a user interface (UI) for changing the aspect ratio. The UI for changing the aspect ratio may be provided semi-transparently or transparently on the currently displayed screen in an overlapped fashion. The UI for changing the aspect ratio may include information on at least one of an aspect ratio and a resolution.

The electronic device 201 may change the aspect ratio according to the aspect ratio selected on the UI and display the changed aspect ratio on the display as denoted by reference numbers 1105 and 1107.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. A module may be implemented mechanically or electronically. For example, a module may include at least one of an Application-Specific Integrated Circuit (ASIC) chip, Field-Programmable Gate Arrays (FPGAs), and a Programmable-Logic Device known or to be developed for certain operations. According to various embodiments of the disclosure, the devices (e.g. modules or their functions) or methods (e.g., operations) may be implemented by computer program instructions stored in a computer-readable storage medium (e.g., memory 830). In the case that the instructions are executed by at least one processor (e.g. processor 820), the at least one processor may execute the functions corresponding to the instructions. The computer-readable storage medium includes a hard disk, a floppy disk, a magnetic medium (e.g. magnetic tape), an optical medium (e.g., CD-ROM and DVD-ROM), a magneto-optical medium (e.g., a floptical disk), and an internal memory. The program commands include a language code created by a compiler or executable by an interpreter. The module or programming module of the present disclosure may include at least one of the aforementioned components with omission of some components or addition of other components. The operations of the modules, programming modules, or other components may be executed in series, in parallel, recursively, or heuristically; some operations may be executed in different order, omitted, or extended with other operations.

What is claimed is:
1. An electronic device comprising:
  a communication module including communication circuitry;
  a display, the display corresponding to a first aspect ratio; and
  a processor configured to:
    control the communication module to establish a communication link for sharing a screen with an external electronic device having an external display;
    control the communication module to acquire, from the external electronic device, via the communication link, at least one resolution supported by the external electronic device;
    select a resolution among the at least one resolution for sharing the screen supported in common by the electronic device and the external electronic device, wherein the selected resolution corresponds to a second aspect ratio;
    control the display to display the screen, the screen including data according to the second aspect ratio, wherein black bars are placed at both sides of the screen of the display;
    control the communication module to transmit, to the external electronic device, via the communication link, the data and the selected resolution for use by the external electronic device in displaying the data at the selected resolution;
    based on a user input for changing the second aspect ratio to the first aspect ratio, control the display to display the screen, the screen including data according to the first aspect ratio; and control the communication module to transmit, to the external electronic device, via the communication link, the data for use by the external electronic device in displaying the data at the selected resolution, wherein black bars are placed at top and bottom sides of a screen of the external display.

2. The electronic device of claim 1, wherein the processor is configured to generate the data to be transmitted based on the selected resolution.

3. The electronic device of claim 1, wherein the processor is configured to:
  determine whether the data to be transmitted comprises data downloaded from a server;
  request the server for data related to the selected resolution based on the data to be transmitted being downloaded from the server; and
  receive the requested data from the server.

4. A screen sharing method of an electronic device, the method comprising:
  establishing a communication link for sharing a screen with an external electronic device having an external display;
  acquiring at least one resolution supported by the external electronic device, the at least one resolution being acquired from the external electronic device via the communication link;
  selecting a resolution among the at least one resolution for sharing the screen supported in common by the electronic device and the external electronic device, wherein the selected resolution corresponds to a second aspect ratio;
  displaying the screen, the screen including data according to the second aspect ratio, wherein black bars are placed at both sides of the screen of the display; and
  transmitting, via the communication link, the data and the selected resolution to the external electronic device for use by the external electronic device in displaying the data at the selected resolution;
  based on a user input for changing the second aspect ratio to the first aspect ratio, displaying the screen, the screen including data according to the first aspect ratio;
  transmitting, to the external electronic device, via the communication link, the data for use by the external electronic device in displaying the data at the selected resolution, wherein black bars are placed at top and bottom sides of a screen of the external display.

5. The method of claim 4, further comprising:
  generating the data to be transmitted based on the selected resolution.

6. The method of claim 4, further comprising:
  determining whether the data to be transmitted comprises data downloaded from a server;
  requesting to the server for data related to the selected resolution based on the data to be transmitted being downloaded from the server; and
  receiving the requested data from the server.

7. The method of claim 4, wherein the data to be transmitted comprises encoding a screen or content displayed on the electronic device.

* * * * *